United States Patent
Cypher et al.

(10) Patent No.: US 7,676,636 B2
(45) Date of Patent: Mar. 9, 2010

(54) METHOD AND APPARATUS FOR IMPLEMENTING VIRTUAL TRANSACTIONAL MEMORY USING CACHE LINE MARKING

(75) Inventors: Robert E. Cypher, Saratoga, CA (US); Shailender Chaudhry, San Francisco, CA (US); Anders Landin, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 411 days.

(21) Appl. No.: 11/775,693

(22) Filed: Jul. 10, 2007

(65) Prior Publication Data

US 2009/0019231 A1 Jan. 15, 2009

(51) Int. Cl.
*G06F 12/08* (2006.01)
(52) U.S. Cl. .................................. 711/141
(58) Field of Classification Search .............. None
See application file for complete search history.

(56) References Cited

U.S. PATENT DOCUMENTS

2005/0013294 A1* 1/2005 Cypher ............... 370/389
2007/0239942 A1* 10/2007 Rajwar et al. ............ 711/147

* cited by examiner

*Primary Examiner*—Kevin Verbrugge
(74) *Attorney, Agent, or Firm*—Park, Vaughan & Fleming LLP; Anthony P. Jones

(57) ABSTRACT

Embodiments of the present invention implement virtual transactional memory using cache line marking. The system starts by executing a starvation-avoiding transaction for a thread. While executing the starvation-avoiding transaction, the system places starvation-avoiding load-marks on cache lines which are loaded from and places starvation-avoiding store-marks on cache lines which are stored to. Next, while swapping a page out of a memory and to a disk during the starvation-avoiding transaction, the system determines if one or more cache lines in the page have a starvation-avoiding load-mark or a starvation-avoiding store-mark. If so, upon swapping the page into the memory from the disk, the system places a starvation-avoiding load-mark on each cache line that had a starvation-avoiding load-mark and places a starvation-avoiding store-mark on each cache line that had a starvation-avoiding store-mark.

24 Claims, 18 Drawing Sheets

METHOD AND APPARATUS FOR IMPLEMENTING VIRTUAL TRANSACTIONAL MEMORY USING CACHE LINE MARKING

BACKGROUND

1. Field of the Invention

Embodiments of the present invention relate to computer systems. More specifically, embodiments of the present invention relate to techniques for implementing virtual transactional memory using cache line marking.

2. Related Art

Transactional memory is a useful programming abstraction that helps programmers write parallel programs that function correctly and helps compilers automatically parallelize sequential threads. Unfortunately, existing transactional memory systems suffer from limitations on the size of transactions that they can support. This limitation occurs because transactional memory systems use structures which are bounded in size to keep track of information which grows proportionately with the transaction size. For example, in a typical transactional memory system, the processor buffers transactional store operations in a store queue. However, if the transaction generates a large number of stores, the store queue overflows and the processor must abort the transaction.

In order to alleviate this problem, processor designers have suggested different techniques to provide both hardware-based and hybrid hardware-software based support for "unbounded" transactions. For example, the UTM transactional memory protocol proposed by Ananian et al. (see C. S. Ananian, K. Asanović, B. Kuszmaul, C. Leiserson, and S. Lie, *Unbounded Transactional Memory*, Proceedings of the 11th International Symposium on High-Performance Computer Architecture (HPCA'05), 2005), and the TCC protocol proposed by Hammond et al. (see L. Hammond, V. Wong, M. Chen, B. Carlstrom, J. Davis, B. Hertzberg, M. Prabhu, H. Wijaya, C. Kozyrakis, and K. Olukotun, *Transactional Memory Coherence and Consistency*, ISCA p. 102, 31st Annual International Symposium on Computer Architecture (ISCA'04), 2004), are both hardware-based techniques that support starvation-avoiding, unbounded transactions. Unfortunately, UTM requires complex hardware which buffers all data overwritten by transactions in memory and automatically searches through linked lists in memory to determine the value to return for loads. Moreover, TCC requires very high bandwidth, because all data stored during each transaction must be broadcast to all other processors. Furthermore, TCC requires that all other processors stop accessing memory whenever a large, starvation-avoiding transaction is being processed.

The Hybrid protocol proposed by Moir et al. (see M. Moir, P. Damron, A. Fedorova, Y. Lev, V. Luchangco, and D. Nussbaum, *Hybrid Transactional Memory*, Proceedings of the 12th International Conference on Architectural Support for Programming Languages and Operating Systems, (San Jose 2006)), and the LogTM protocol proposed by Moore et al. (see K. Moore, J. Bobba, M. Moravan, M. Hill & D. Wood, *LogTM: Log-based Transactional Memory*, 12th Annual International Symposium on High Performance Computer Architecture (HPCA-12), 2006), are hybrid hardware-software-based techniques that use hardware for certain transactions but fall back on software for other transactions. More specifically, the Hybrid protocol uses software to run transactions that cannot be completed in hardware (due, for example, to resource constraints), and thus implements a software transactional memory protocol which involves buffering store data in separate data structures until the transaction commits. In contrast, the LogTM protocol requires hardware support to copy old values of certain memory locations that are written within a transaction, and it requires software support to traverse data structures and restore old values of cache lines that were written by transactions that abort. The use of software to implement all or part of the transactional memory system can seriously degrade the performance of the transactional memory system. Furthermore, the hardware support required for LogTM is complex and difficult to implement.

The VTM protocol proposed by Rajwar et al. (see Rajwar, R., Herlihy, M., Lai, K., *Virtualizing Transactional Memory*, Proceedings, 32nd International Symposium on Computer Architecture 2005 (ISCA '05), 2005), is another hybrid hardware-software based technique that uses hardware to implement transactions that fit in private caches, but maintains a shared data structure with data that has overflowed the private caches in software. The VTM protocol requires that the cache-coherence protocol be modified in order to maintain coherence on virtual addresses.

Hence, what is needed is a processor that can execute unbounded transactions without the problems of the above-described transactional memory systems.

SUMMARY

Embodiments of the present invention implement virtual transactional memory using cache line marking. The system starts by executing a starvation-avoiding transaction for a thread. While executing the starvation-avoiding transaction, the system places starvation-avoiding load-marks on cache lines which are loaded from and places starvation-avoiding store-marks on cache lines which are stored to. Next, while swapping a page out of a memory (e.g., out of a cache or out of DRAM) and to a disk during the starvation-avoiding transaction, the system determines if one or more cache lines in the page have a starvation-avoiding load-mark or a starvation-avoiding store-mark. If so, upon swapping the page into memory from the disk, the system places a starvation-avoiding load-mark on each cache line that had a starvation-avoiding load-mark and places a starvation-avoiding store-mark on each cache line that had a starvation-avoiding store-mark.

In some embodiments, the system determines if one or more cache lines in the page have a starvation-avoiding load-mark or starvation-avoiding store-mark as the page is swapped out of the memory and to the disk.

In some embodiments, the system determines if one or more cache lines in the page have a starvation-avoiding load-mark or starvation-avoiding store-mark after the page has been swapped out of the memory, but before any starvation-avoiding load-mark or starvation-avoiding store-marks for the cache lines in the page have been overwritten in the memory.

In some embodiments, the system records a cache line address and a starvation-avoiding load-mark indicator for each cache line in the page that is determined to have a starvation-avoiding load-mark and records a cache line address and a starvation-avoiding store-mark indicator for each cache line on the page that is determined to have a starvation-avoiding store-mark. Then, when swapping the page into the memory from the disk, the system places a starvation-avoiding load-mark or a starvation-avoiding store-mark on each cache line that was recorded as having a starvation-avoiding load-mark or a starvation-avoiding store-mark, respectively.

In some embodiments, the system sets a starvation-avoiding load-mark indicator for the page if the page includes any cache line that has a starvation-avoiding load-mark or sets a starvation-avoiding store-mark indicator for the page if the page includes any cache line that has a starvation-avoiding store-mark. Then, when swapping the page into the memory from the disk, the system places a starvation-avoiding load-mark on all cache lines in the page if the starvation-avoiding load-mark indicator for the page is set and places a starvation-avoiding store-mark on all cache lines in the page if the starvation-avoiding store-mark indicator for the page is set.

In some embodiments, the system sets a load-mark indicator bit or a store-mark indicator bit in a translation table entry for the page.

In some embodiments, the system sets a system-level starvation-avoiding load-mark indicator if the page includes a cache line that had a starvation-avoiding load-mark and sets a system-level starvation-avoiding store-mark indicator if the page includes a cache line that had a starvation-avoiding store-mark. Then, when swapping the page or any other page into the memory from the disk, the system places a starvation-avoiding load-mark on all cache lines in the page if the system-level starvation-avoiding load-mark indicator is set and places a starvation-avoiding store-mark on all cache lines in the page if the system-level starvation-avoiding store-mark indicator is set.

In some embodiments, the system allows certain direct memory access (DMA) read operations to read the data in cache lines containing starvation-avoiding store marks.

In some embodiments, the system allows certain DMA write operations to overwrite the data in cache lines containing starvation-avoiding load-marks and starvation-avoiding store-marks.

In some embodiments, the system executes at least one non-starvation-avoiding transaction for another thread while executing the starvation-avoiding transaction. Executing this non-starvation-avoiding transaction involves: (1) placing non-starvation-avoiding load-marks on cache lines which are loaded during the non-starvation-avoiding transaction; (2) placing non-starvation-avoiding store-marks on cache lines which are stored to during the non-starvation-avoiding transaction; and (3) storing the addresses of non-starvation-avoiding load-marked or non-starvation-avoiding store-marked cache lines in a private buffer corresponding to the other thread.

In some embodiments, the system determines if at least one cache line in the page has a non-starvation-avoiding load-mark and/or a non-starvation-avoiding store-mark. If so, the system delays swapping out the page until the non-starvation-avoiding load-mark and/or the non-starvation-avoiding store-mark has been cleared from the cache line.

In some embodiments, when placing a starvation-avoiding load-mark or a starvation-avoiding store-mark in metadata for each cache line, the system writes a current value for a timestamp into the metadata for the cache line.

In some embodiments, if the frame in the memory has not been overwritten since the page was swapped out of the memory; the system swaps the page back into the same frame in the memory from the disk, wherein the metadata for any starvation-avoiding load-marked or starvation-avoiding store-marked cache line still contains the starvation-avoiding load-mark and starvation-avoiding store-mark.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1A:
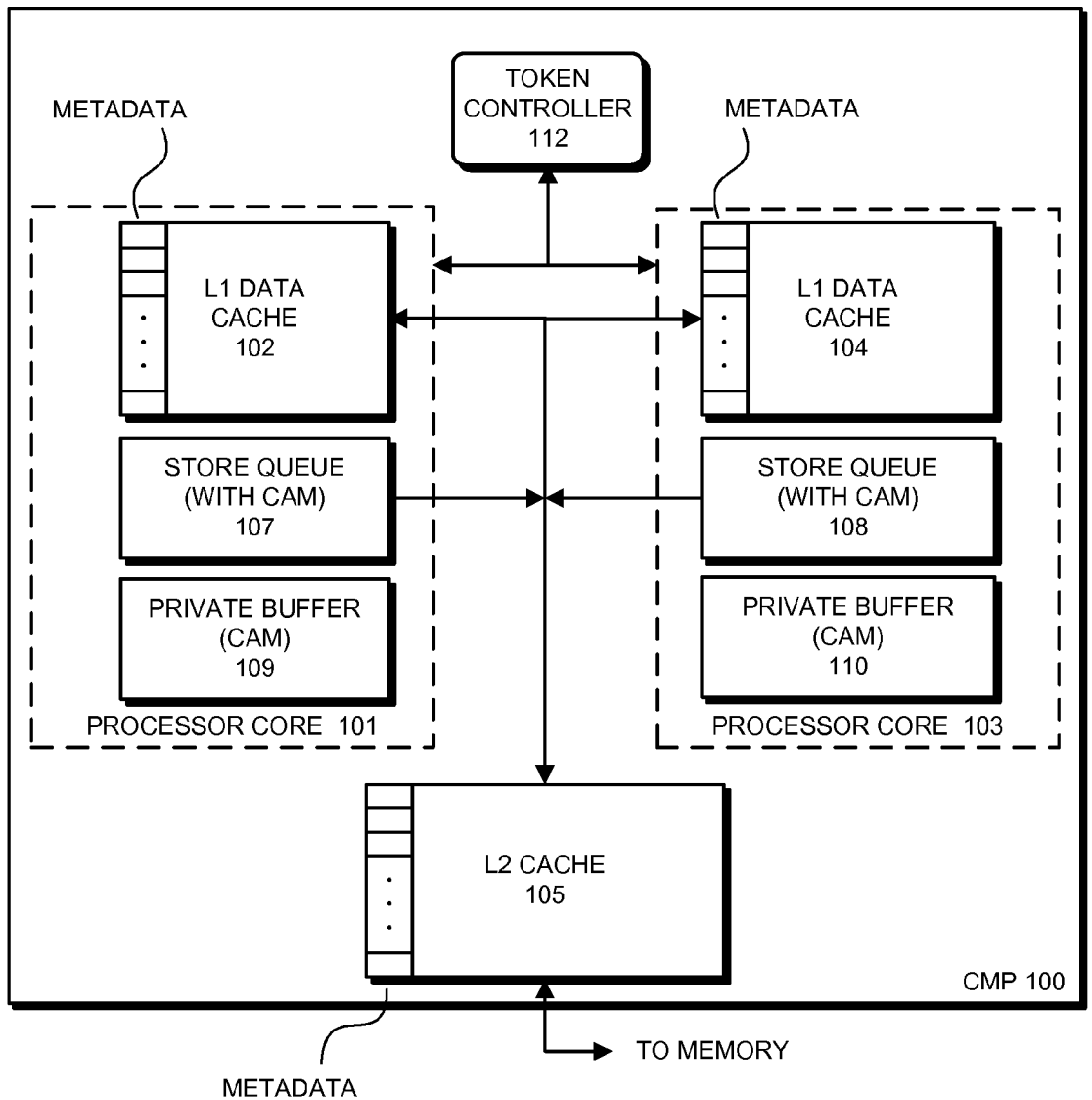
FIG. 1A illustrates an exemplary Chip Multi-Processor (CMP) system in accordance with embodiments of the present invention.

FIG. 1A illustrates an exemplary Chip Multi-Processor (CMP) 100 in accordance with embodiments of the present invention. CMP 100 is incorporated onto a single semiconductor die, and includes two processor cores, 101 and 103.

In some embodiments of the present invention, CMP 100 is part of a computer system. Within the computer system, CMP 100 can be coupled to devices such as video cards, network cards, optical drives, and other peripheral devices using a bus, a network, or another suitable interface.

Processor cores 101 and 103 include L1 data caches 102 and 104, respectively, and they share L2 cache 105. Along with L1 data caches 102 and 104, processor cores 101 and 103 include store queues 107 and 108, which buffer pending store operations.

During a store operation, processor core 101 first performs a lookup for a corresponding cache line in L1 data cache 102. If the lookup generates a miss in L1 data cache 102, processor core 101 creates an entry for the store in store queue 107 and sends a corresponding fetch for the store to L2 cache 105. If the lookup generates a hit in the L1 data cache 102, processor core 101 creates an entry for the store in store queue 107.

During a subsequent load operation, processor core 101 uses a CAM structure to perform a lookup in store queue 107 to locate completed but not-yet-retired stores to the same address that are logically earlier in program order. For each byte being read by the load operation, if such a corresponding store exists, the load operation obtains its value from store queue 107 rather than from the memory subsystem.

Processor cores 101 and 103 include private buffers 109 and 110, which maintain copies of addresses of load-marked and store-marked cache lines to facilitate efficient lookups of theses addresses. When a thread needs to load from or store to a cache line, that thread first checks its private buffer to determine if the thread has already load-marked or store-marked the cache line.

In addition, CMP system 100 includes token controller 112. Token controller 112 controls the distribution of a single "token" among the processor cores in CMP 100. Because only one starvation-avoiding transaction is allowed to execute at a time, token controller 112 ensures that only one processor (or thread) has a token at any given time. Note that when a processor obtains the token, the token is delivered from token controller 112 to the processor along with a timestamp that is incremented each time a token is granted.

In addition, to support transactional memory, cache lines contained in L1 data caches 102 and 104, L2 cache 105 include metadata. This metadata can include a load-mark, a store-mark, a starvation-avoiding load-mark, a starvation-avoiding store-mark, a timestamp, a reader count, and an SA-requested flag (i.e., a starvation-avoiding transaction requested flag).

A thread (or a processor) can place a load-mark or a store-mark on a cache line by asserting the corresponding load- or store-mark in the metadata for the cache line. When a cache line is load-marked by a thread, no other threads are permitted to store to the cache line, thereby preventing another thread from overwriting a value in the cache line. On the other hand, when a cache line is store-marked by a thread, the store-mark prevents another thread from loading the value from or storing a value to the cache line, thereby providing the store-marking thread with exclusive access to the cache line. We refer to the process of placing such marks on a cache line as either "load-marking" or "store-marking" the cache line.

A thread (or processor) can place a starvation-avoiding load-mark or store-mark on a cache line while the thread is executing a starvation-avoiding transaction by asserting the corresponding starvation-avoiding load-mark or starvation-avoiding store-mark in the metadata for the cache line. When a cache line has the starvation-avoiding load-mark asserted, if the marking thread is still executing the starvation-avoiding transaction, no other thread is permitted to store to the cache line. On the other hand, when a cache line has the starvation-avoiding store-mark asserted, if the marking thread is still executing the starvation-avoiding transaction, no other thread is permitted to load from or store to the cache line, thereby providing the marking thread with exclusive access to the cache line during the transaction. Note that when a thread asserts a starvation-avoiding load-mark or a starvation-avoiding store-mark on a cache line, the thread also writes the value of the timestamp (i.e., the timestamp delivered by token controller 112) in the metadata for the cache line.

Before a starvation-avoiding thread asserts a starvation-avoiding load-mark or a starvation-avoiding store-mark on a cache line, the thread determines if there is an existing load-mark or store-mark on the cache line. If so, another thread has marked the cache line. In some embodiments of the present invention, this other thread is made to fail its transaction. In another embodiment, the other thread that placed the load- or store-mark continues its transaction and the thread that is executing the starvation-avoiding transaction asserts the SA-requested flag in the metadata for the cache line and delays its access to the cache line. When the SA-requested flag is asserted, no other thread can place a load- or store-mark on the cache line. Consequently, when the prior load- or store-marking thread clears its load- or store-mark from the cache line, the thread that is executing the starvation-avoiding transaction can: clear the SA-requested flag; place a starvation-avoiding load-mark or store-mark on the cache line; and can proceed with the starvation-avoiding transaction.

A load-mark prevents any other thread from writing to the cache line but not from reading from the cache line, so multiple threads can place load-marks on a cache line (i.e., multiple threads can be reading from the cache line simultaneously). Hence, in some embodiments of the present invention, each cache line's metadata includes a "reader count" value that keeps track of how many threads have placed load-marks on the cache line. When multiple threads have load-marked the cache line, other threads are prevented from writing to the cache line until all of the threads have removed their load-marks (i.e., the reader count value is zero).

In addition, when a thread has placed a load-mark or a starvation-avoiding load-mark on a cache line, the thread can perform any number of loads from the cache line. In other words, as long as a load-mark is set on the cache line, the marking thread may freely load the value from the cache line. The store- and starvation-avoiding store-marks functions in the same way for stores to the cache line.

Figure 1B:
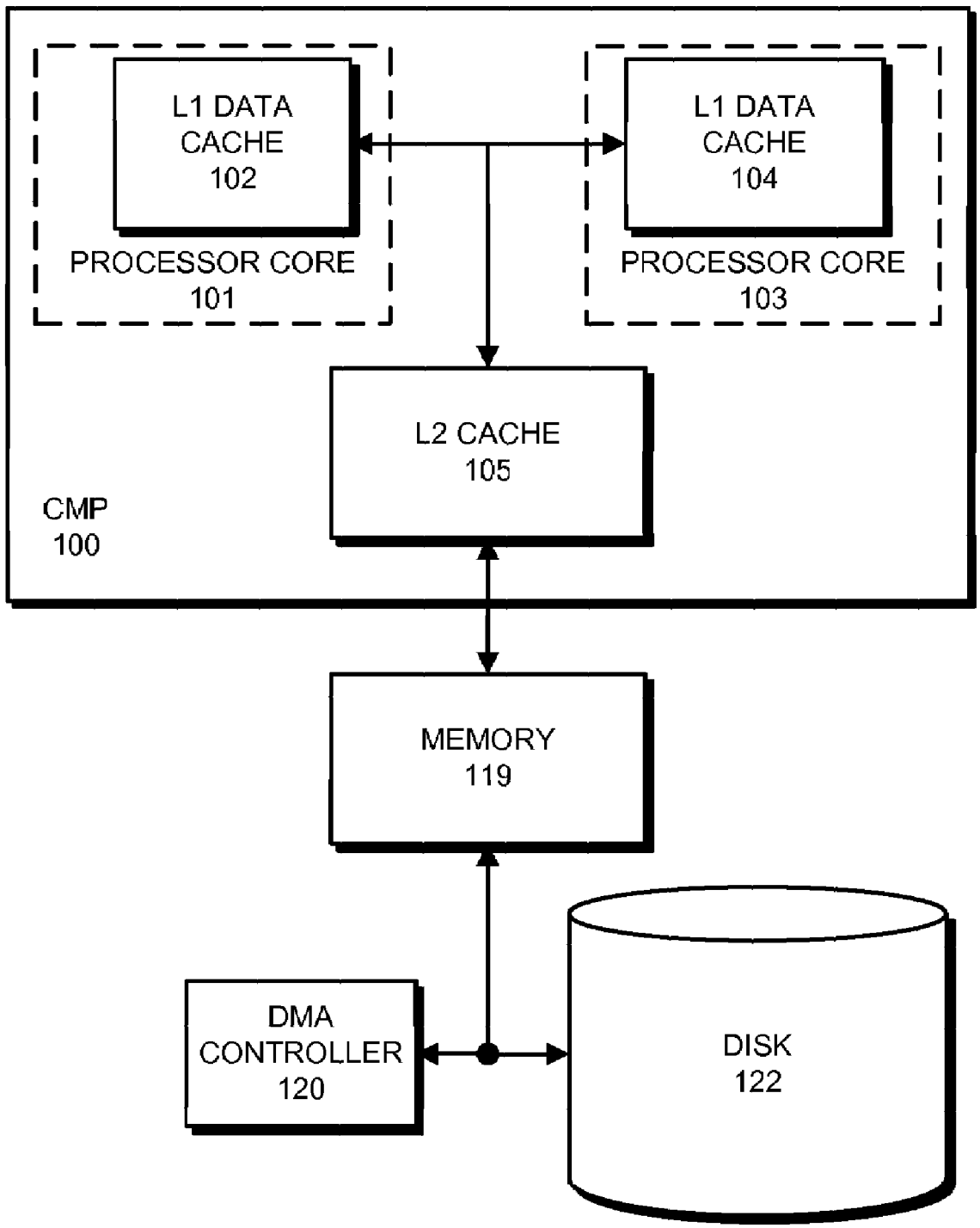
FIG. 1B illustrates an exemplary computer system that supports virtual memory in accordance with embodiments of the present invention.

FIG. 1B illustrates an exemplary computer system that supports virtual memory in accordance with embodiments of the present invention. FIG. 1B includes CMP 100, memory 119, DMA controller 120, and disk 122. (Note that we call the hierarchy of memory 119 and the caches within CMP 100 "memory." For example, in FIG. 1B, L1 cache 102, L1 cache 104, L2 cache 105, and memory 119 are included in the memory.)

Disk 122 is a mass-storage device which stores instructions and data for CMP 100. Disk 122 can be, for example, a disk drive, a high-capacity flash memory, a solid-state memory, or another mass-storage device.

DMA controller 120 allows devices within the computer system to access a disk (such as disk 122) independently of CMP 100. For example, the memory can use DMA controller 120 to read and/or write pages from the memory to disk 122, thereby not requiring CMP 100 to perform the entire transfer of the pages (although CMP 100 may initiate the transfer of the pages).

Although we use DMA controller 120 for the purposes of illustration, alternative embodiments use: a memory management unit (MMU), another type of application-specific integrated circuit (ASIC), or a combination, such as a MMU/DMA, to perform reading and/or writing independently of CMP 100.

Load-Marking

The Load-Mark Request Operation

Figure 2A:
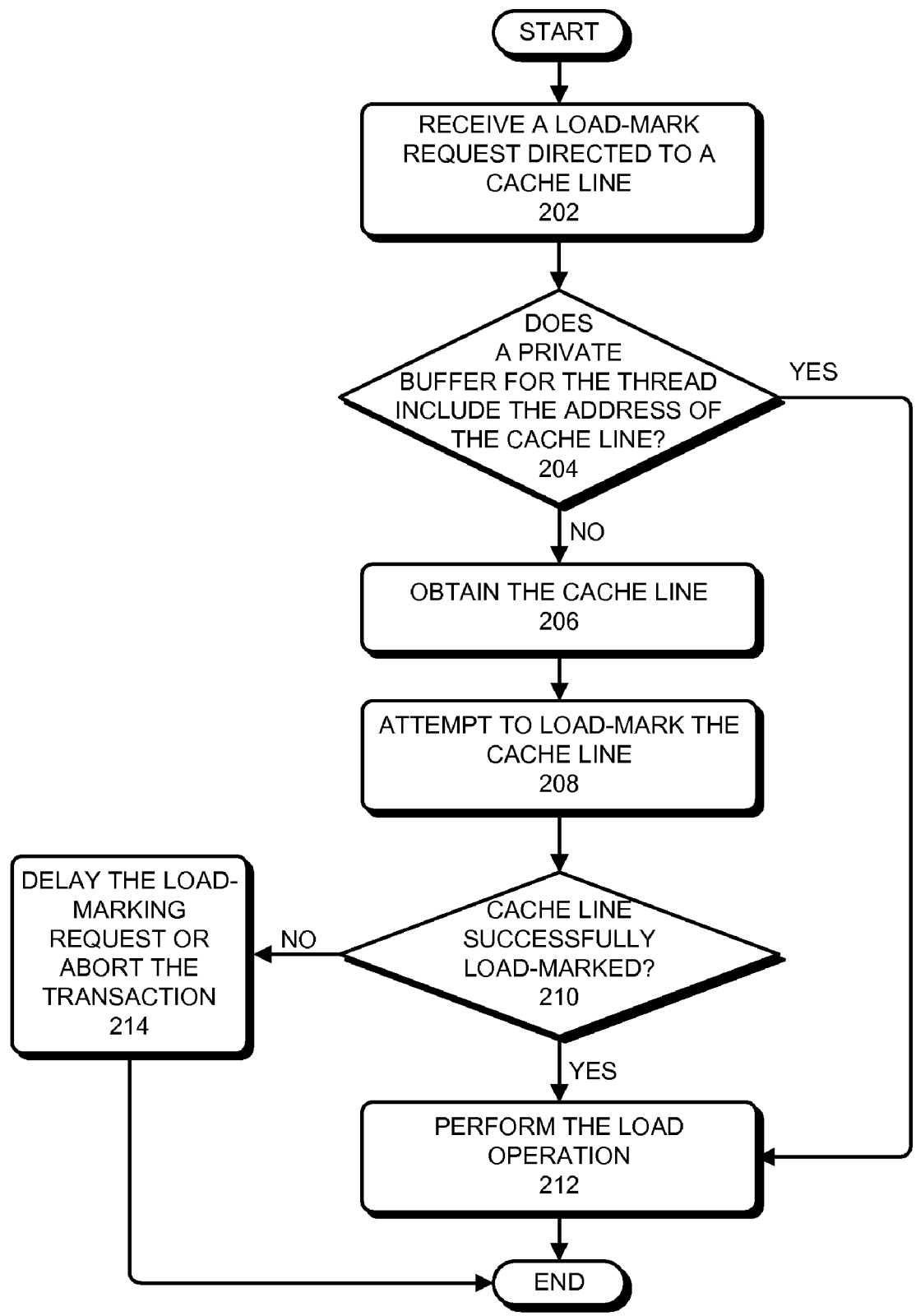
FIG. 2A presents a flowchart illustrating the process of performing a load-mark request operation in accordance with embodiments of the present invention.

FIG. 2A presents a flowchart illustrating the process of performing a load-mark request operation in accordance with embodiments of the present invention. Note that the load-mark request includes two operations; the load-marking operation and the load operation. When a load-mark request is handled, the system first attempts the load-marking operation. Upon successfully concluding the load-marking operation, the system automatically returns the cache line, thereby completing the load operation.

The process starts when the system receives a load-mark request from a thread, wherein the load-mark request is directed to a cache line (step 202). Next, the system checks a private buffer associated with the thread to determine whether the thread has already load-marked the cache line (step 204). Specifically, the system performs a lookup in the thread's private buffer based on the address of the load operation to locate a corresponding address for a load-marked cache line. If the private buffer contains a corresponding address, the thread has already load-marked the cache line and the thread can proceed with the load operation (step 212).

If the private buffer does not contain the corresponding address, the thread has not yet load-marked the cache line. In this case, the system then obtains the cache line (step 206) and attempts to load-mark the copy of the cache line in the local cache (step 208).

If load-marking is successful (step 210), the system performs the load operation (step 212). Otherwise, if the load-marking is unsuccessful, the system retries the load-mark request after a delay. In embodiments of the present invention, the load-mark request is retried a predetermined number of times, and if the load-mark request remains unsuccessful, the transaction is aborted (step 214).

Figure 2B:
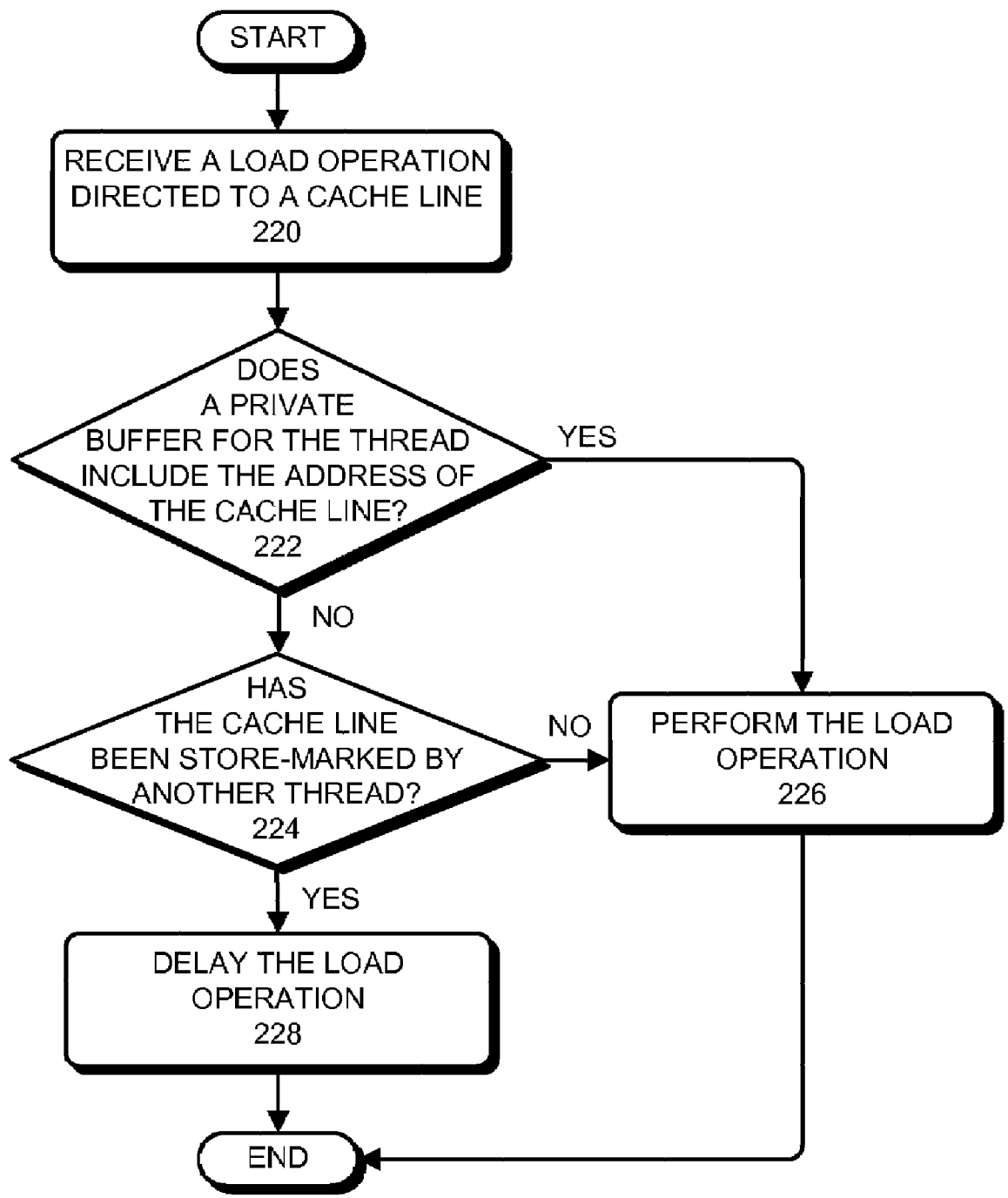
FIG. 2B presents a flowchart illustrating the process of performing a load operation without load-marking the cache line in accordance with embodiments of the present invention.

FIG. 2B presents a flowchart illustrating the process of performing a load operation without load-marking the cache line in accordance with embodiments of the present invention. The process starts when the system receives a load operation from a thread, wherein the load operation is directed to a cache line (step 220).

Next, the system checks a private buffer associated with the thread to determine whether the thread has already load-marked the cache line (step 222). Specifically, the system performs a lookup in the thread's private buffer based on the address of the load operation to locate a corresponding address for a load-marked cache line. If the private buffer contains a corresponding address, the thread has already load-marked the cache line and the system performs the load operation (step 226).

If cache line's address is not in the private buffer, the system determines if the cache line has been store-marked by another thread (step 224). If so, the thread cannot load the cache line and the load operation is retried after a delay (step 228). Otherwise, the system performs the load operation (step 226).

Attempting to Load-Mark the Cache Line

Figure 3:
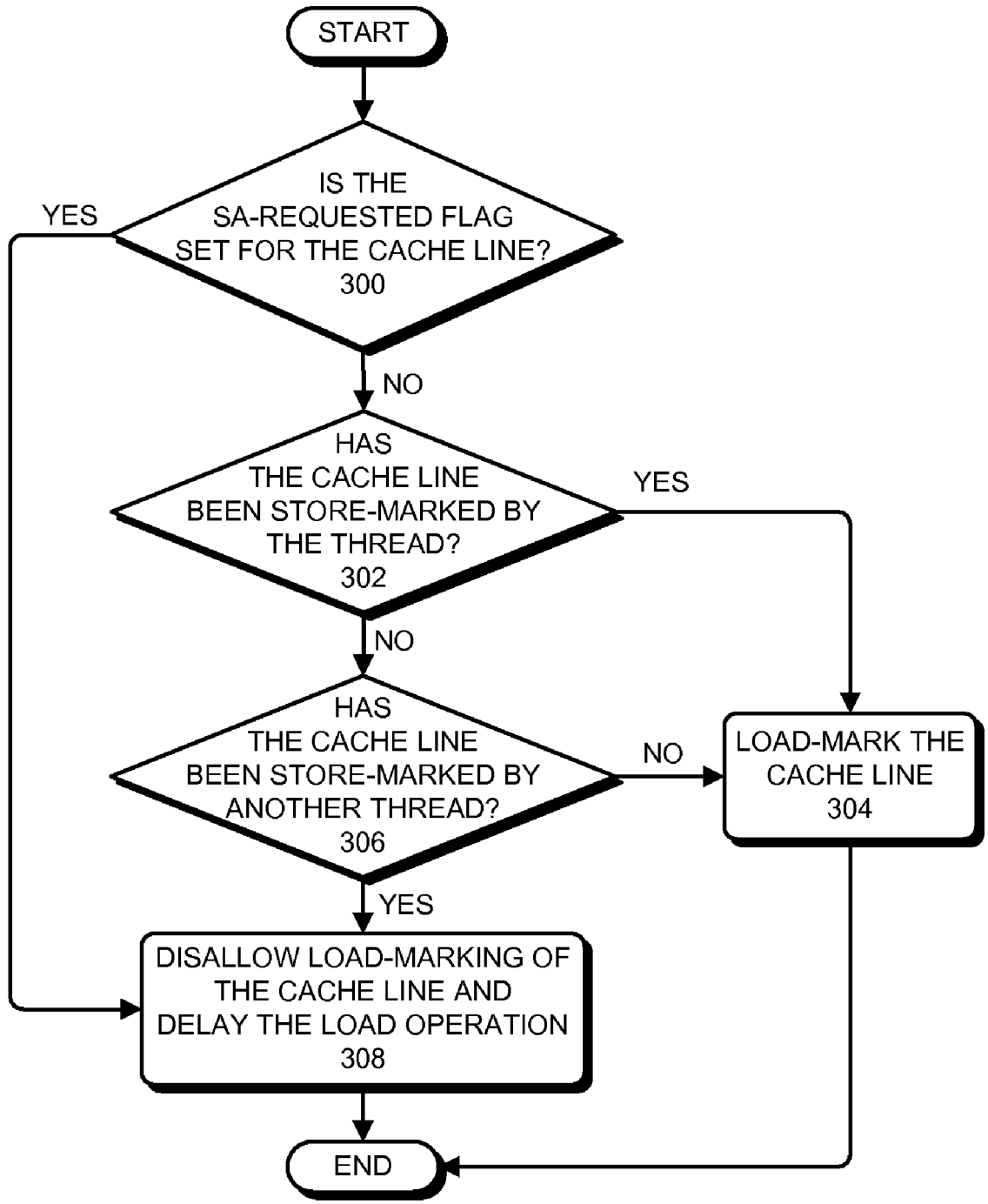
FIG. 3 presents a flowchart illustrating the process of attempting to load-mark the cache line in accordance with embodiments of the present invention.

FIG. 3 presents a flowchart illustrating the process of attempting to load-mark the cache line in accordance with embodiments of the present invention. During this process, the system first determines whether the SA-requested flag is asserted for the cache line (step 300). If so, another thread (or processor) has requested to execute a starvation-avoiding transaction, and no load-marks may be placed on the cache line. Hence, the thread delays the load operation (step 308).

Otherwise, the system determines whether the cache line has been store-marked by the thread (step 302). Specifically, the system checks a store-mark buffer which maintains addresses of cache lines which have been store-marked by the thread to see if the address of the cache line exists in the store-mark buffer.

If the cache line has been store-marked by the thread, no other thread is permitted to load-mark the cache line (because of the exclusive property of store-marks). However, the thread may itself place a load-mark on a cache line that the thread has already store-marked. Hence, in this case, the system load-marks the cache line (step 304).

On the other hand, if the system determines that the cache line has not been store-marked by the thread, the system next determines if the cache line has been store-marked by another thread (step 306). If so, the thread cannot load-mark the cache line and the load operation is delayed (step 308). Otherwise, the system knows that the cache line has not been store-marked by any thread and the system proceeds to load-mark the cache line for the thread (step 304).

Figure 4:
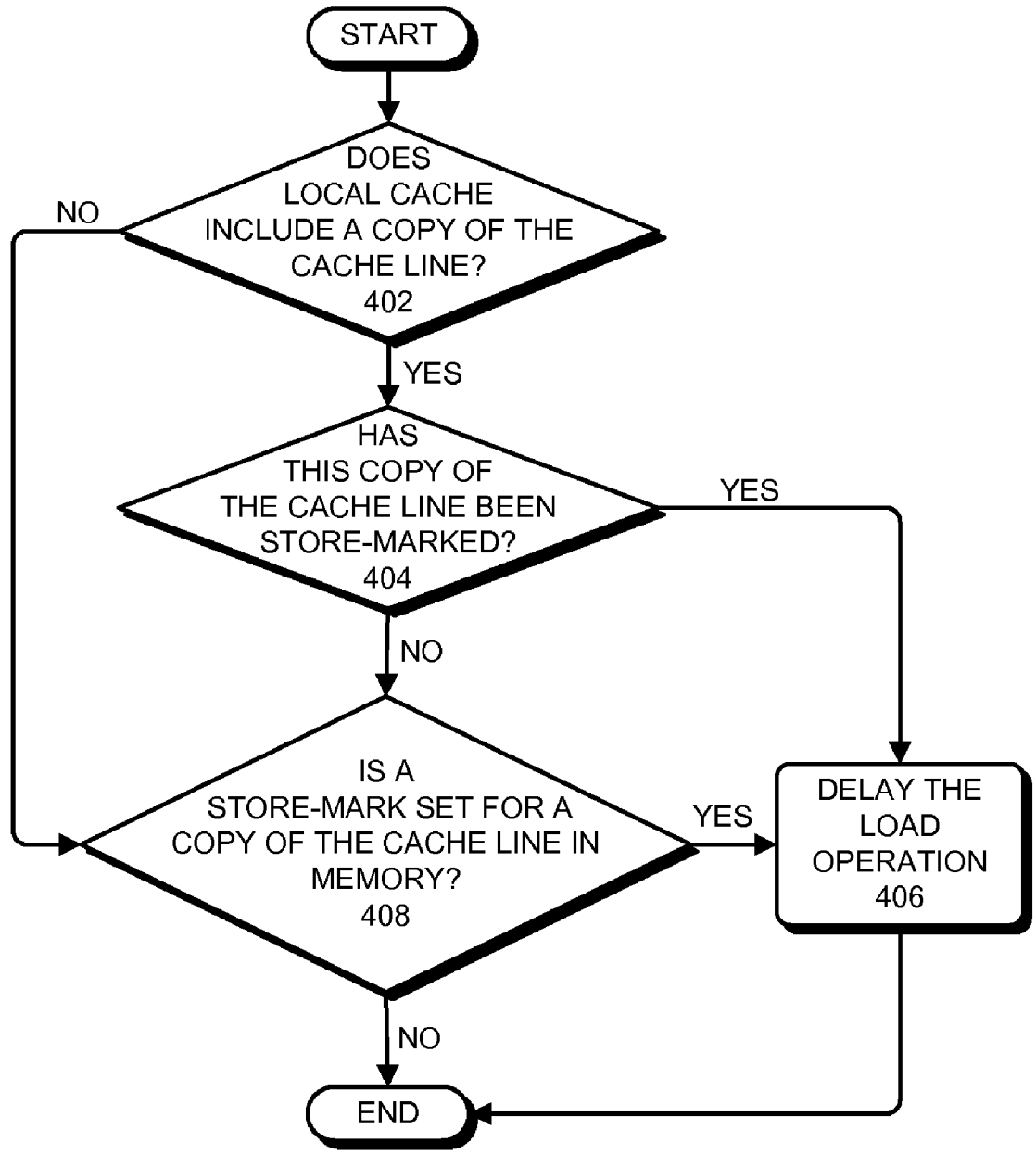
FIG. 4 presents a flowchart illustrating the process of determining whether the cache line has been store-marked by another thread in accordance with embodiments of the present invention.

FIG. 4 presents a flowchart illustrating the process of determining whether the cache line has been store-marked by another thread in accordance with embodiments of the present invention. During this process, system first checks in the thread's local cache for a copy of the cache line (step 402). If the system finds a copy of the cache line in the thread's local cache, the system examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in memory (step 408). If so, the cache line has been store-marked by another thread, which means the cache line cannot be load-marked, and the load operation is delayed (step 406).

Store-Marking

The Store-Marking Operation

Figure 5A:
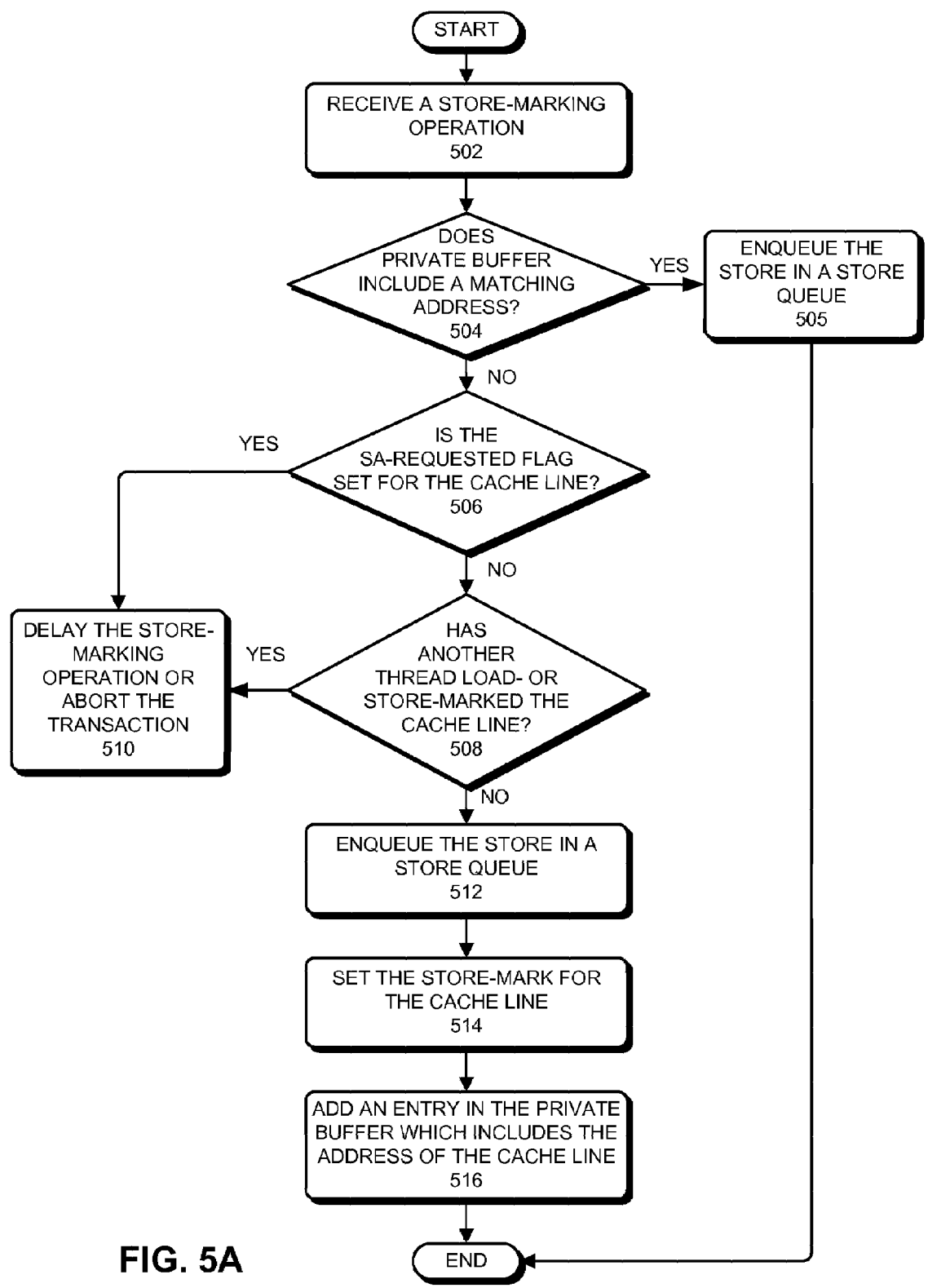
FIG. 5A presents a flowchart illustrating the process of performing a store-marking operation in accordance with embodiments of the present invention.

FIG. 5A presents a flowchart illustrating the process of performing a store-marking operation in accordance with embodiments of the present invention. The system first receives a store-marking operation which is directed to a cache line (step 502).

Next, the system checks the thread's private buffer 109 to determine whether the thread has already store-marked the cache line (step 504). Specifically, the system performs a lookup in the thread's private buffer based on the address of the memory reference to locate a corresponding address for a store-marked cache line. If the private buffer contains a corresponding address, the thread enqueues the store in a store-queue (step 505) and the store-marking operation ends.

If the private buffer does not contain a matching address, the thread concludes that it has not set the store-mark. In this case, the thread determines whether the SA-requested flag is asserted for the cache line (step 506). If so, another thread has requested to execute a starvation-avoiding transaction, and no store-marks may be placed on the cache line. Hence, the thread delays the store-marking operation (step 510). In embodiments of the present invention, the store-marking operation is retried a predetermined number of times, and if the store-marking operation continues to be unsuccessful, the transaction is aborted (step 510).

The thread then determines whether the cache line has been store-marked or load-marked by another thread (step 508). During this process, system first checks in the thread's local cache for a copy of the cache line. If the system finds a copy of the cache line, the system examines the load-mark and store-mark to determine whether the cache line has been load-marked or store-marked by another thread. If the store-mark in the copy of the cache line is not set, the system determines whether the store-mark has been set in another copy of the cache line which exists in memory. If a store-mark is set in either location, the store-marking operation is delayed and retried (step 510). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store-marking operation is delayed and retried (step 510). In embodiments of the present invention, the store-marking operation is retried a predetermined number of times, and if the store-marking operation continues to be unsuccessful, the transaction is aborted (step 510).

Note that the system can use a cache-coherence mechanism to determine whether another the memory holds a store-marked or load-marked copy of the cache line. This can involve sending an exclusive access request for the cache line to the other caches. If successful, the exclusive access request returns the cache line including store-mark status and the load-mark reader count. In embodiments of the present invention, if the cache line has been store-marked in another cache, the system receives a NACK signal from the other cache which causes the request to fail, in which case the memory operation can be retried. In this embodiment, however, if the system does not receive a NACK signal, the system can then obtain exclusive (writable) access to that cache line provided no other thread has load-marked the cache line.

Note that in order to perform a memory operation, it may be necessary to use the cache coherence protocol to obtain a copy of the cache line in a suitable state in the local cache. For example, if the memory operation is a load, it may be necessary to obtain a copy of the cache line in the shared (S), exclusive (E), owned (O), or modified (M) state. Similarly, if the memory operation is a store, it may be necessary to obtain a copy of the cache line in the E or M state (and if the cache line is in the E state, it may be necessary to change the cache line to the M state upon performing the store). If the cache coherence protocol is used to obtain a copy of the cache line in the E or M state, the request for this copy may differ from the exclusive access request mentioned in the preceding description. This is because the thread performing the store has already placed a store mark on the cache line, and thus the request should not receive a NACK signal.

If a store-mark or load-mark is not set in memory, the system enqueues the store operation in store queue 107 (step 512). The system then sets the store-mark for the cache line (step 514) and adds the address of the cache line to the private buffer (step 516). Note that this entry remains in the private buffer until subsequent changes are made to the state of the cache line, such as removing the store-mark.

In embodiments of the present invention, when a thread performs one or more stores to a store-marked cache line, the last of the stores can include a flag indicating that the store-mark should be cleared. When such a flag is encountered, the system releases the store-marked cache line by unsetting the store-mark in a copy of the cache line in its local cache, and additionally removing the address of the cache line from its private buffer.

In embodiments of the present invention, a thread selectively places store-marks on cache lines. In other words, the thread may reorder some stores and not reorder other stores, in which case the thread store-marks on cache lines associated with stores that are reordered, but does not have to store-mark cache lines associated with stores that are not reordered and that are not part of a transaction.

Figure 5B:
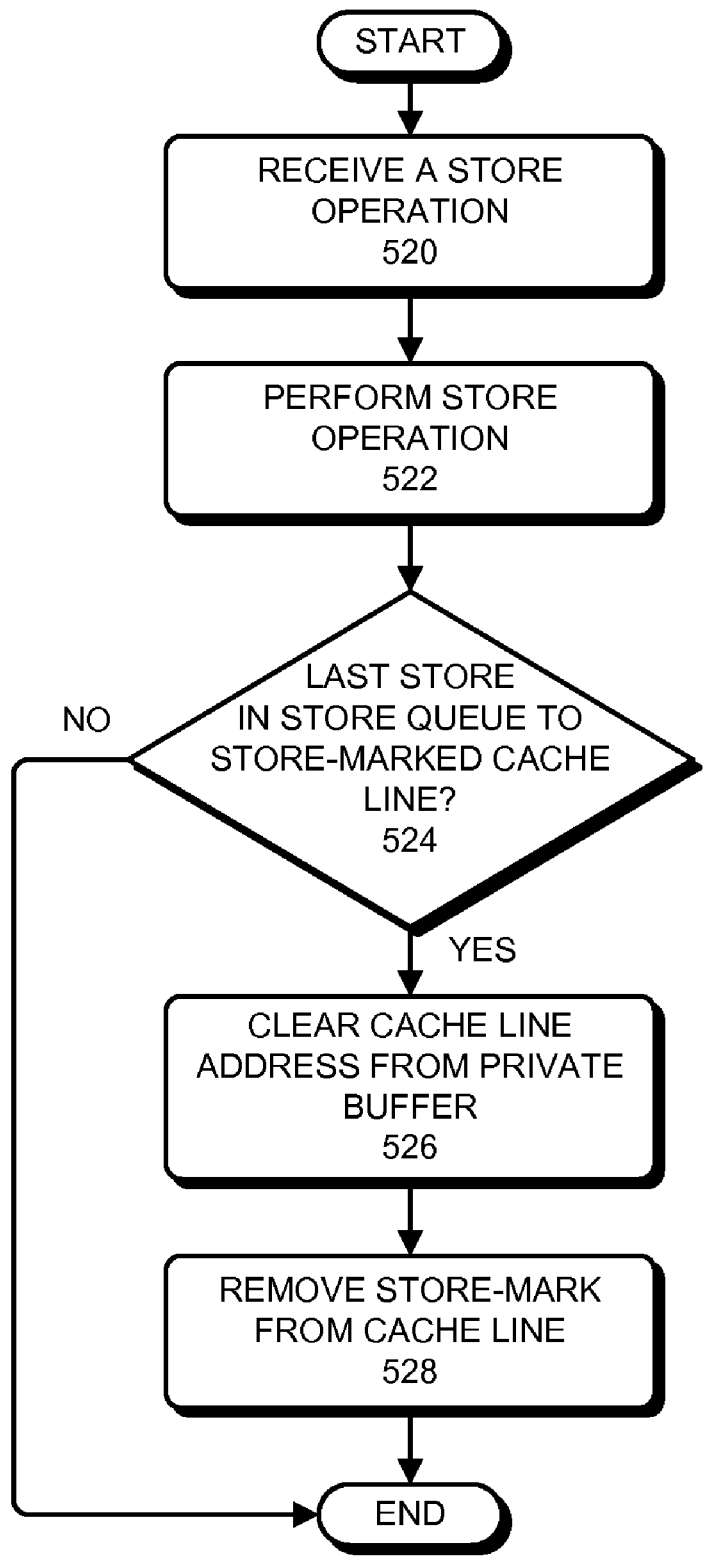
FIG. 5B presents a flowchart illustrating the process of performing a store operation for a cache line that has been store-marked in accordance with embodiments of the present invention.

FIG. 5B presents a flowchart illustrating the process of performing a store operation for a cache line that has been store-marked in accordance with embodiments of the present invention. The system first receives a store operation for a thread which is directed to a cache line from the store queue (step 520) and performs the store operation (step 522).

The system then determines if the store operation was the last store operation in the store queue to a store-marked cache line (step 524). If the store operation was the last store operation, the system clears the address of the store-marked cache line from the private buffer (step 526) and removes the store-mark from the cache line (step 528).

Figure 5C:
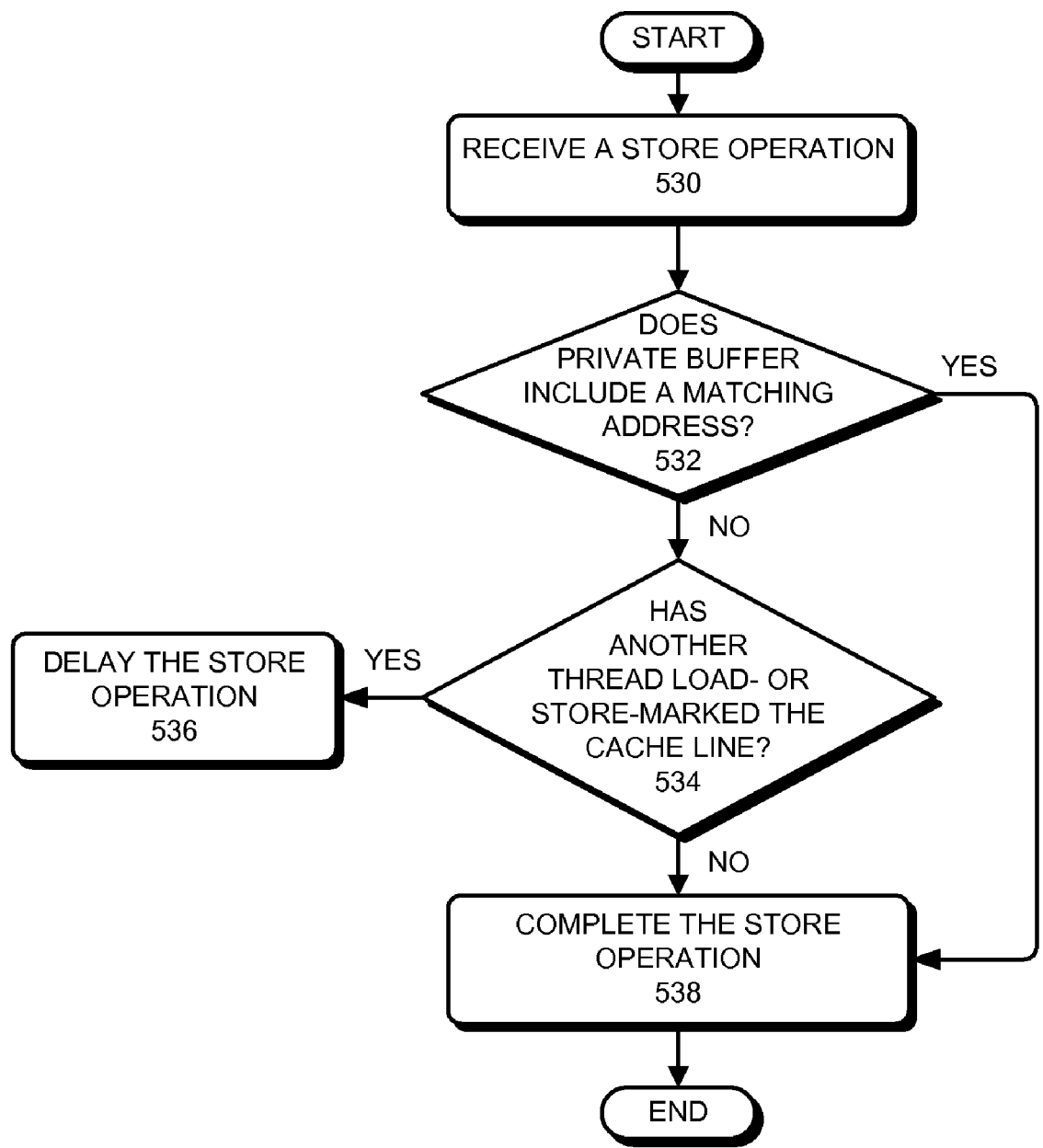
FIG. 5C presents a flowchart illustrating the process of performing a store operation for a cache line that has not been store-marked in accordance with embodiments of the present invention.

FIG. 5C presents a flowchart illustrating the process of performing a store operation for a cache line that has not been store-marked in accordance with embodiments of the present invention. The system first receives a store operation for a thread from the store queue which is directed to a cache line (step 530). For the purposes of illustration, we assume that the store operation was the oldest store operation in the store queue and that the store operation has not been re-ordered with respect to other store operations.

Next, the system checks the thread's private buffer 109 to determine whether the thread has already store-marked the cache line (step 532). Specifically, the system performs a lookup in the thread's private buffer based on the address of the memory reference to locate a corresponding address for a store-marked cache line. If the private buffer contains a corresponding address, the thread proceeds with the store operation (step 538).

If, however, the private buffer does not contain a matching address, the thread concludes that it has not set the store-mark. If the thread has not set the store-mark, the system determines whether the cache line has been store-marked or load-marked by another thread (step 534). During this process, the system first checks in the thread's local cache for a copy of the cache line. If the system finds a copy of the cache line, the system examines the store-mark to determine whether the cache line has been store-marked by another thread. If the store-mark in the copy of the cache line is not set, the system determines whether the store-mark has been set in another copy of the cache line which exists in memory. If a store-mark is set in either location, the store operation is retried after a delay (step 536). On the other hand, in order to determine that no other thread has placed a load-mark on the cache line, the system verifies that either (1) there are no load-marks on the line, or (2) there is exactly one load-mark on the line, and this thread is the one that placed that load-mark on the line (the system can verify this by finding the address of the cache line in the thread's private buffer of cache lines that the thread has load-marked). If there is a load-mark set by another thread on the cache line, the store operation is retried after a delay (step 536).

Propagating Store-Marks and Load-Marks

In embodiments of the present invention, the system eventually propagates the load-marks and store-marks in the metadata for a cache line to the memory and to disk. The following sections explain the process of propagating the load-marks and store-marks. Note that we refer to the combination of load-marks and store-marks together as "metadata" for cases where load-marks and store-marks are propagated in a similar way. Note further that the following section describes the propagation of non-starvation-avoiding load-marks and store-marks.

Note that obtaining a copy of the cache line in the proper coherency protocol state (as detailed in the following sections) is just the first step in reading from or writing to a cache line. After the cache line has been obtained in the proper coherency protocol state, the system has to verify that the desired access can be performed and, if necessary, mark the cache line before performing a read or write to the cache line.

Figure 6A:
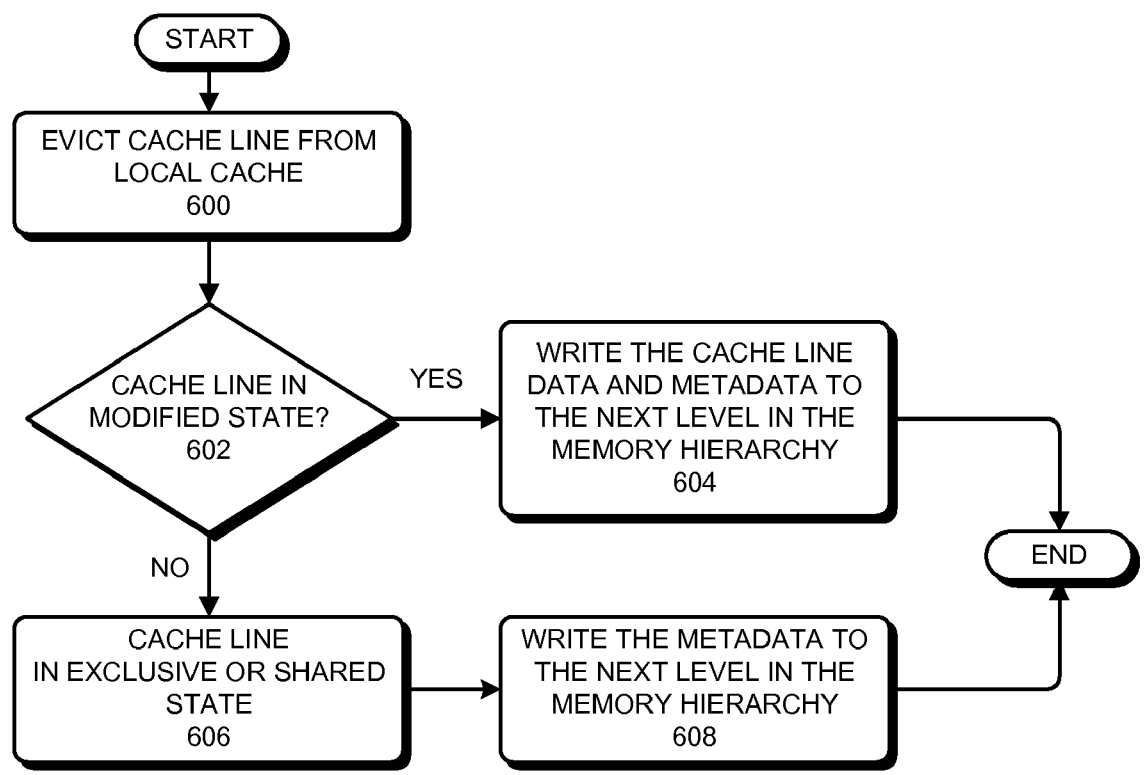
FIG. 6A presents a flowchart illustrating the process of propagating load-mark metadata for an evicted cache line in accordance with embodiments of the present invention.

We first consider the case where a cache line is evicted from a cache as illustrated in FIG. 6A. The process starts when a cache line is evicted from a cache (step 600). The system determines if the cache line is in the modified state (step 602). If so, the system evicts the line by writing the cache line data and the metadata to the next level of the memory hierarchy (step 604).

On the other hand, if the cache line is not in the modified state, but is in the exclusive state or shared state (step 606), the system does not propagate the data in the cache line, but writes the metadata to the next level of the memory hierarchy (step 608).

Figure 6B:
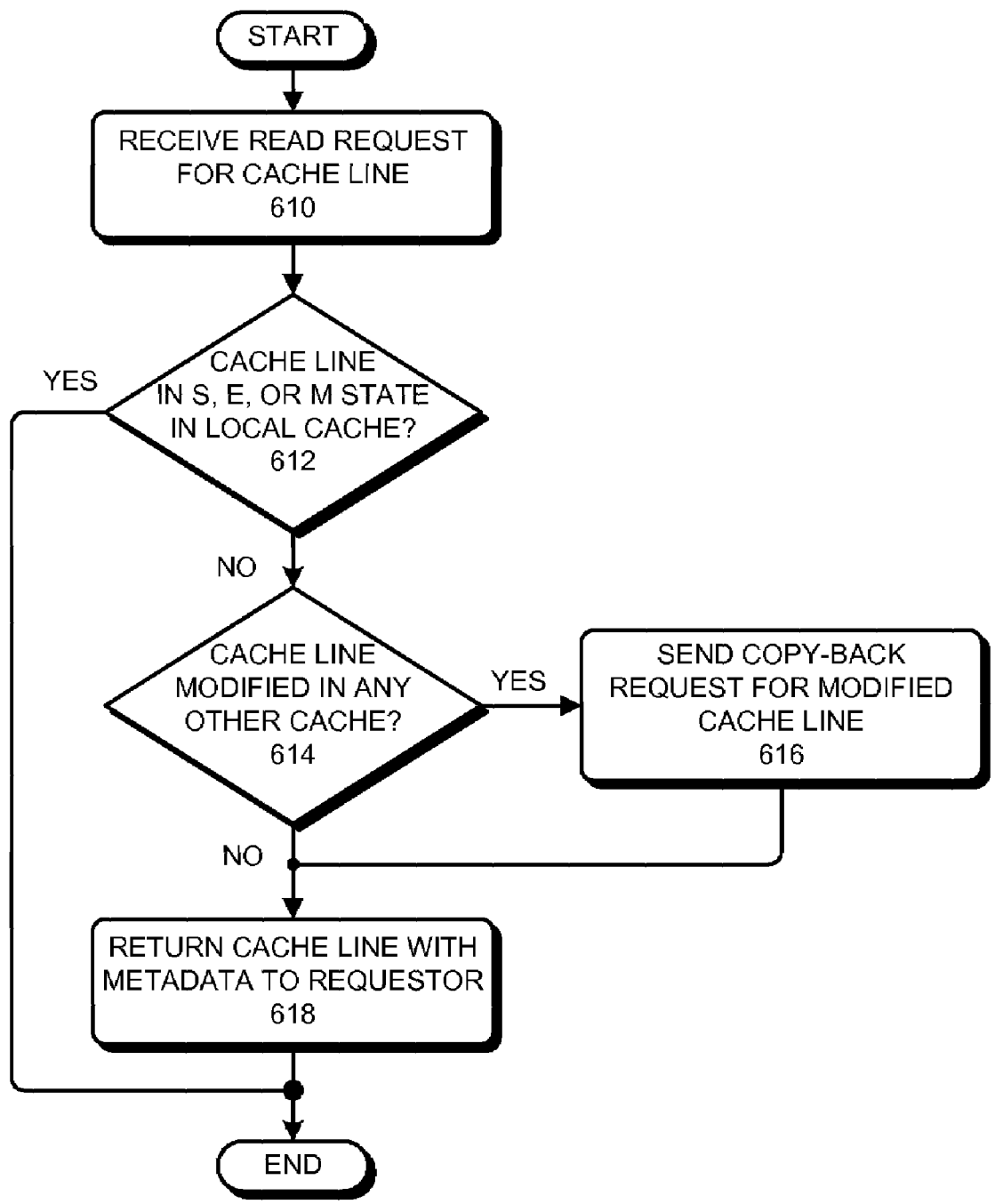
FIG. 6B presents a flowchart illustrating the process of propagating load-mark metadata for a cache line during a read operation in accordance with embodiments of the present invention.

We next consider the case where the cache line is subject to a read operation as illustrated in FIG. 6B. The process starts when the system receives a read request for a cache line (step 610). The system first determines if the cache line is held the shared, exclusive, or modified state the thread's local cache (step 612). If so, the thread can read the local copy of the cache line and the process is complete.

Otherwise, the system determines if the cache line is held in any other processor's cache in the modified state (step 614). If so, the system sends a copyback coherence request to that cache (step 616). Upon receiving a copyback coherence request, the processor that holds the modified copy of the cache line responds with a copy of the cache line and the metadata, which are returned to the requester (step 618). Note that when responding to the copyback coherence request, the processor that holds the modified copy responds with a copy of the cache line, but also retains a local copy of the cache line in the shared state.

When the processor sends the load-mark in response to a copyback coherence request, the processor can partition the reader count value into two parts and can send part of the reader count value and can retain part of the reader count value. However, the sum of the sent reader count value and the retained reader count value must equal the starting reader count value in the local copy of the cache line. For example, where the reader count value in the local copy of the cache line originally indicated that there were four load marks on the cache line, the processor can send two of the load marks with the sent line, while retaining two of the load marks in the local copy of the cache line.

Figure 6C:
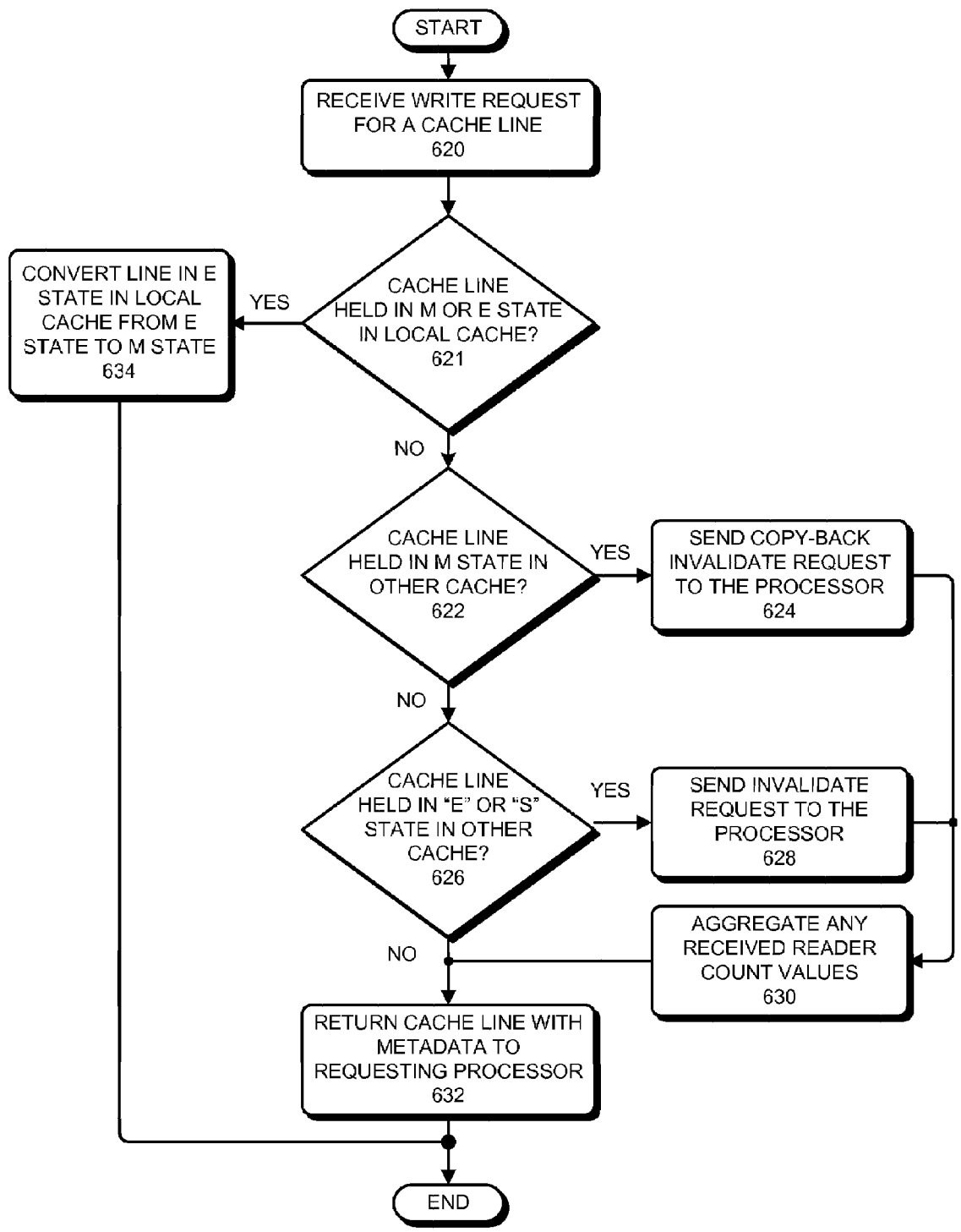
FIG. 6C presents a flowchart illustrating the process of propagating load-mark metadata for a cache line during a write operation in accordance with embodiments of the present invention.

We next consider the case where the cache line is subject to a write request that is illustrated in FIG. 6C. Note that a thread attempting to write to the cache line first obtains a copy of the cache line in the modified state, which invalidates all copies of the line in other caches and obtains the cache line in the modified state for the requesting thread.

The process starts when the system receives a write request for a cache line (step 620). The system first determines if the cache line is held in the local cache in the modified or exclusive state (step 621). If the cache line is held in the modified state, the thread already has write access to the cache line, so the process is complete.

If the cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system. Hence, for embodiments of the present invention, whenever a cache line is delivered to a local cache in the exclusive state, the cache line is delivered with reader count equal value to the total number of threads that have put load-marks on the cache line. In other words, when the cache line is delivered, the reader count value in the memory system is zero and all of the load-marks are included in the metadata for the local copy of the cache line. Note that the store-mark is propagated with each copy of the cache line, so no special treatment is required for the store-mark in this embodiment.

If the cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and metadata are propagated back to the memory and the local copy of the given cache line in the given cache is invalidated.

On the other hand, if the system receives a write request for a cache line that is held in any other processor's cache in the exclusive state or the shared state (step 626), the system sends an invalidate coherence request to all other caches in the coherence domain that may contain a valid copy of the cache line (step 628). Upon receiving the invalidate coherence request at a given cache that holds the copy of the cache line, the metadata is propagated back to the disk and the local copy of the cache line in the given cache is invalidated.

In addition, the system determines the number of load-marks that are on the copy of the cache line in memory. In embodiments of the current invention, the system makes the determination by reading the metadata of the cache line in memory.

The system then sums load-marks in the metadata received from memory and from the disk (step 630) and responds to the requester with a cache line, including the metadata (step 632). Hence, the copy of the line delivered to the requesting thread has a reader count value which is equal to the number of threads that have placed a load-mark on the line and a store-mark that is asserted if any other thread had asserted a local store-mark.

By propagating the metadata as described above, the system maintains the invariant that the sum of the load-marks in all valid copies of a cache line equals the total number of threads that have load-marked the line. Maintaining this invariant prevents a thread from storing to a line on which another thread has placed a load-mark.

Note that the system can use negative, as well as positive, values for reader count values. This can be helpful when a thread wants to remove a load-mark from a cache line that has been evicted from its local cache.

Non-Starvation-Avoiding Transactions

Embodiments of the present invention implement non-starvation-avoiding transactions (alternatively called "trans-actions") by maintaining a transaction state (including a "not-in-transaction" state and a "transaction-pending" state) for each thread and by buffering data from stores which occur during the transaction in the store queue. The system then either commits the transaction by performing the associated stores, or aborts the transaction by removing the associated stores from the store queue and restoring the pre-transactional state of the thread from a checkpoint generated at the start of the transaction.

The preceding sections of this disclosure describe how load-marks and store-marks can be placed on cache lines to allow an arbitrary number of reads and writes to be performed to those cache lines. The reads and writes can be placed in the memory order at any point from the placing of the corresponding load-mark or store-mark on the line to the clearing of that mark, regardless of when they were actually performed by the hardware.

Embodiments of the present invention use load-marks and store-marks to implement transactions by requiring that (1) the processor (or thread) places a load-mark on all lines read in a transaction, (2) the processor (or thread) places a store-mark on all lines written in the transaction, (3) these load-marks and store-marks are all held simultaneously when the transaction commits, (4) all loads that precede the transaction in program order are either committed prior to the transaction commit or have a load-mark on the cache line when the transaction commits, and (5) all stores that precede the trans-action in program order are either committed prior to the transaction commit or have a store-mark on the cache line when the transaction commits. These rules guarantee that all reads and writes within the transaction can be placed (in program order) in the memory order when the transaction commits, without any intervening memory accesses from any other processors (or threads), thus preserving transactional semantics. Specifically, when the transaction commits, all earlier (in program order) loads for which load-marks are held are placed in the memory order, then all earlier (in program order) stores for which store-marks are held are placed in the memory order, then all loads and stores within the transaction are placed in the memory order.

Embodiments of the present invention use the same rules to implement atomic instructions (such as read-modify-write) by viewing the load and store portions of the atomic as forming a (very short) transaction. Note that the rules do not require stores which are earlier than the atomic instruction to commit to the memory system before the atomic instruction commits. Rather, such earlier stores can simply hold their store-marks when the atomic instruction commits. As a result, processing atomic instructions does not require draining the store queue. Furthermore, embodiments of the present invention use the same rules to facilitate processor hardware executing speculatively and out-of-order. In other words, for these embodiments, hardware speculative execution is also viewed as a transaction.

Executing a Non-Starvation-Avoiding Transaction

Figure 7:
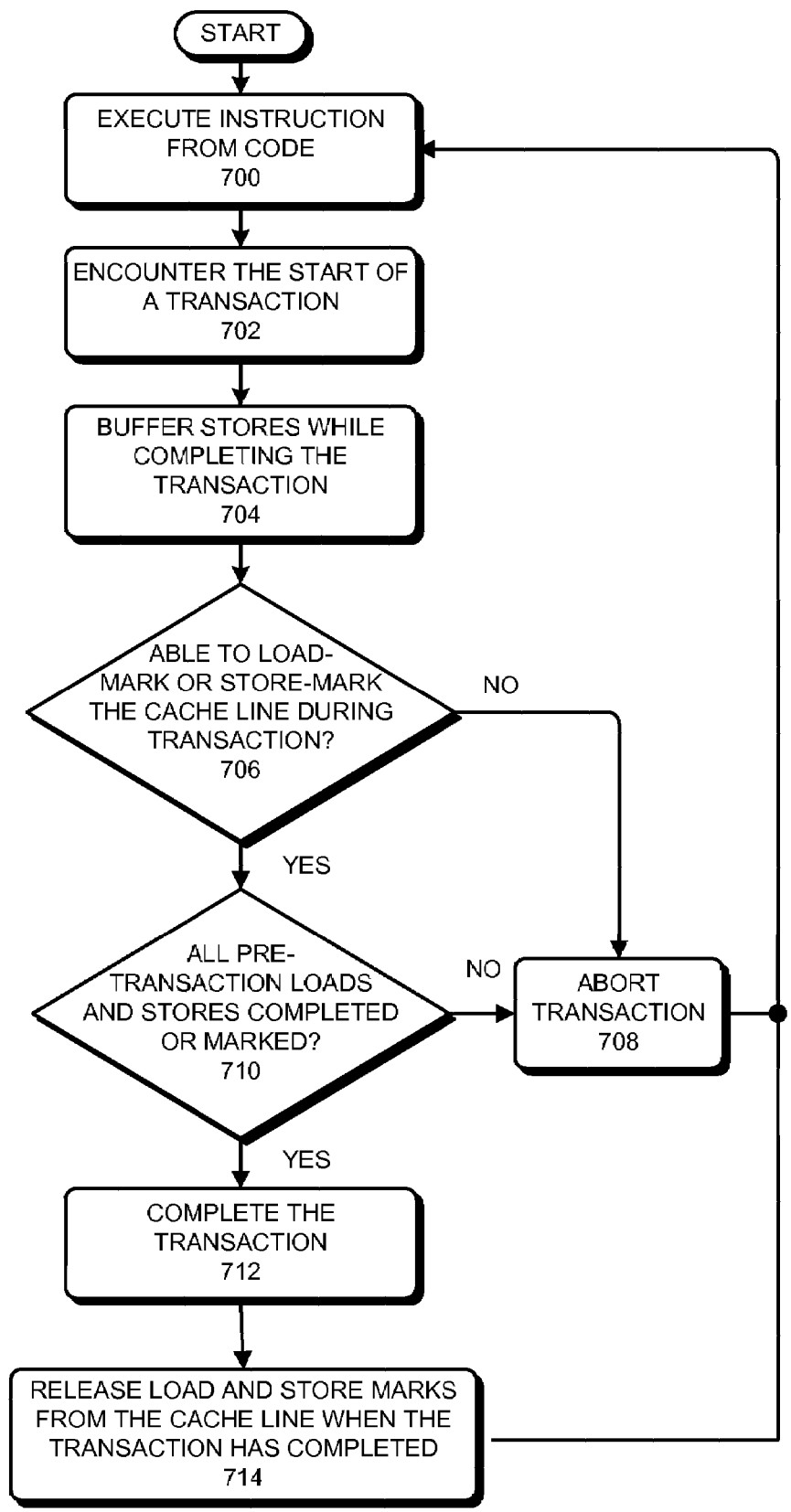
FIG. 7 presents a flow chart illustrating the process of executing a non-starvation-avoiding transaction in accordance with embodiments of the present invention.

FIG. 7 presents a flow chart illustrating the process of executing a non-starvation-avoiding transaction (alternatively called a "transaction") in accordance with embodiments of the present invention. The process starts with a thread executing instructions (step 700).

The thread then encounters the start of a transaction (step 702). For example, the transaction can be initiated by a start transactional execution ("STE") instruction, which puts the thread in transactional-execution mode. For a more detailed explanation of starting transactional execution see U.S. patent application Ser. No. 10/637,166, entitled "Start Transactional Execution (STE) Instruction to Support Transactional Program Execution," by inventors Marc Tremblay, Quinn A. Jacobson and Shailender Chaudhry, filed on 8 Aug. 2003, which is hereby incorporated by reference to explain the process of starting transactional execution. Alternatively a transaction can be defined to be an atomic operation, in which case the start of the transaction can be indicated by an atomic instruction, such as a read-modify-write instruction. Furthermore, a transaction can be defined as hardware speculative execution, in which case the start of the transaction can be indicated by the entry to the hardware speculative execution episode.

Upon entering the transaction, the system switches the transaction state indicator to "transaction pending," takes a checkpoint of the architectural state of the strand, and commences buffering of store operations encountered during the transaction (step 704).

During the transaction, the thread attempts to place a load-mark on all cache lines read by the thread and a store-mark on all cache lines written by the thread (step 706). If the thread is unable to place a mark on a cache line, the transaction aborts (step 708). For example, if the transaction attempts to place a store-mark on a cache line that has already been load-marked or store-marked by another thread, the thread is unable to place the store-mark and the transaction aborts and the system restores the architectural state that was checkpointed at the start of the transaction. The system then returns to step 700 and continues to execute instructions from the program code.

Note that in order to protect marked cache lines from subsequent memory operations by other threads during the transaction, all load-marks and store-marks placed on cache lines during the transaction remain on the cache line until the transaction commits. In other words, the marking thread simultaneously holds all the load-marks and store-marks placed during the transaction when the transaction commits.

When the transaction has completed (as indicated by the completion of the atomic instruction, the return to non-speculative execution after a hardware speculative execution episode, or by the commit instruction at the end of transactional execution), the system prepares to commit the results of the transaction. Before committing the results of transactional execution, the system determines whether all loads that precede the transaction in program order have either been committed or have a read mark on a corresponding cache line. The system also determines whether all stores that precede the transaction in program order are either committed to memory prior to the transaction commit or have a write mark on a corresponding cache line (step 710). If not, the transaction aborts (step 708). The system then returns to step 700 and continues to execute instructions from the program code.

Otherwise, because the pre-transaction loads and stores either commit before the transaction or hold a load-mark or store-mark on an associated cache line, all reads and writes within the transaction can be committed when the transaction completes without any intervening memory accesses from any other thread. In this case, the system commits the results of the transaction by completing the stores buffered during the transaction (step 712).

After committing the results of the transaction, the thread releases any load-marks and store-marks from any cache lines that were accessed during the transaction and returns the transaction state indicator to the "not-in-transaction" state (step 714). The system then returns to step 700 and continues to execute instructions from the program code.

Starvation-Avoiding Transactions

Embodiments of the present invention implement starvation-avoiding transactions using cache line marking which is similar to, but different from, the marking described in the preceding sections. For example, unlike non-starvation-avoiding transactions, starvation-avoiding transactions are not invoked due to hardware speculative-execution. In addition, only one starvation avoiding transaction can execute at a time, in order to avoid deadlock between two starvation-avoiding transactions.

When a processor (or thread) wants to begin a starvation-avoiding transaction, the processor requests a special token. The granting of the token can be implemented within special hardware in a globally-accessible memory controller or other system component, or the granting of the token can be implemented in coherent memory which supports atomic accesses. Only one processor (or thread) can be granted the token for executing starvation-avoiding transactions at a time. Each granted token has a timestamp which is incremented each time a new token is granted. Tokens are ideally granted in a fair, starvation-free manner (such as using round-robin arbitration).

When a processor has been granted a token, the processor starts to execute its starvation-avoiding transaction. Before the processor reads or writes any cache line, the processor places a special "starvation-avoiding" load-mark or "starvation-avoiding" store-mark on the cache line and writes the timestamp of the token to metadata on the cache line. The starvation-avoiding load-mark and starvation-avoiding store-mark and the timestamp are stored in metadata that stays with the cache line in all caches. For embodiments of the present invention, the metadata is propagated from the cache line to the memory in a similar fashion to the coherence load-mark and store-marks described in the preceding sections of this description. In alternative embodiments, the metadata is propagated from the cache line to other caches in a similar fashion to the coherence load-mark and store-marks described in a pending U.S. patent application entitled "Efficient Marking of Shared Cache Lines," by Robert E. Cypher and Shailender Chaudhry, having Ser. No. TO BE ASSIGNED, and filing date TO BE ASSIGNED, which is hereby incorporated by reference to explain the details of propagating metadata. When the starvation-avoiding load-mark or starvation-avoiding store-mark has been placed on the line, the processor performs its read or write operation on the cache line.

If the processor executing a starvation-avoiding transaction encounters a memory conflict with a processor that is executing another transaction (i.e., a non-starvation-avoiding transaction), either the other transaction is made to fail or the other transaction is allowed to complete and the processor executing the starvation-avoiding transaction is then allowed to proceed. In particular, if the cache line marking protocol described with reference to FIG. 7 is being used for the non-starvation-avoiding transactions, the processor executing the starvation-avoiding transaction can set a special SA-requested flag on the cache line (analogous to the store-requested flag described in a pending U.S. patent application entitled "Preventing Store Starvation in a System that Supports Marked Coherence," by Robert E. Cypher and Shailender Chaudhry, having Ser. No. TO BE ASSIGNED, and filing date TO BE ASSIGNED. The SA-requested flag prevents any other processors from setting new load-marks or store-marks on the cache line if the processor executing the starvation-avoiding transaction has placed its mark on the line. When the processor completes the starvation-avoiding transaction, the processor releases the token.

In embodiments of the present invention, a thread can place a starvation-avoiding load-mark on a copy of a cache line held in a local cache in the shared state while another thread has already placed a non-starvation-avoiding load-mark on a copy of that cache line held in a different local cache in the shared state. In these embodiments, the system maintains the reader count and the starvation-avoiding load-mark if one or more of the copies of the cache lines in the local caches are replaced or invalidated.

In alternative embodiments, the system prevents the thread from placing the starvation-avoiding load-mark on a copy of a cache line in the shared state that already has a non-starvation-avoiding load-mark on a copy of that cache line held in a different local cache. In these embodiments, the system performs a copyback-invalidate request before placing a starvation-avoiding load-mark on the cache line. If the reader count value of the returned cache line is positive (i.e., non-zero) the thread either (1) waits and then re-attempts the starvation-avoiding load-marking operation or (2) terminates the non-starvation-avoiding transaction and then proceeds with the starvation-avoiding load-marking operation.

Whenever a processor that is not executing a transaction or is executing a non-starvation-avoiding transaction wants to read (or write) a cache line, the processor first checks if there is a starvation-avoiding write (or read or write) mark on the line. If no such mark is found, the processor can read or write the line as allowed by the underlying cache-coherence protocol. If such a mark is found, the processor checks if there is a currently-active starvation-avoiding transaction, and if there is one, determines what timestamp is being used by the starvation-avoiding transaction. Only if there is a currently executing starvation-avoiding transaction, and if that transaction is associated with the same timestamp as the cache line being accessed, does the processor have to wait and try again later. If the processor does have to wait and if the processor holds resources that could prevent the starvation-avoiding transaction from completing, the processor should free those resources within bounded time. Specifically, if the processor is using the cache line marking protocol described with respect to FIG. 7 and if the processor is executing a non-starvation-avoiding transaction, the processor should abort that transaction and clear the load- and store-marks that the processor has set within bounded time.

Note that starvation-avoiding transactions are non-speculative. In other words, the starvation-avoiding transaction is guaranteed to complete. Consequently, the results of starvation-avoiding transactions can be committed to the architectural state of the processor as the underlying operation is completed.

In addition, during a starvation-avoiding transaction, the processor (or thread) can perform IO accesses. IO accesses can include "non-cacheable accesses," and other types of accesses that have side-effects (e.g., a non-cacheable load can affect the state of some device, and a non-cacheable store can affect the state of a device that is greater than the setting of the particular target of the store to the value specified by the store). IO accesses can be accesses to peripherals, but they can also be to configuration, status, or error reporting registers on a processor or ASIC. For example, in order to set up a DMA operation from an IO card, one may perform a sequence of non-cacheable stores to registers on the IO card that specify the address and size of the DMA operation. These operations are typically "memory mapped" in that they use normal load and store instructions but they access locations that cannot be cached and that can have side-effects.

Executing a Starvation-Avoiding Transaction

Figure 8:
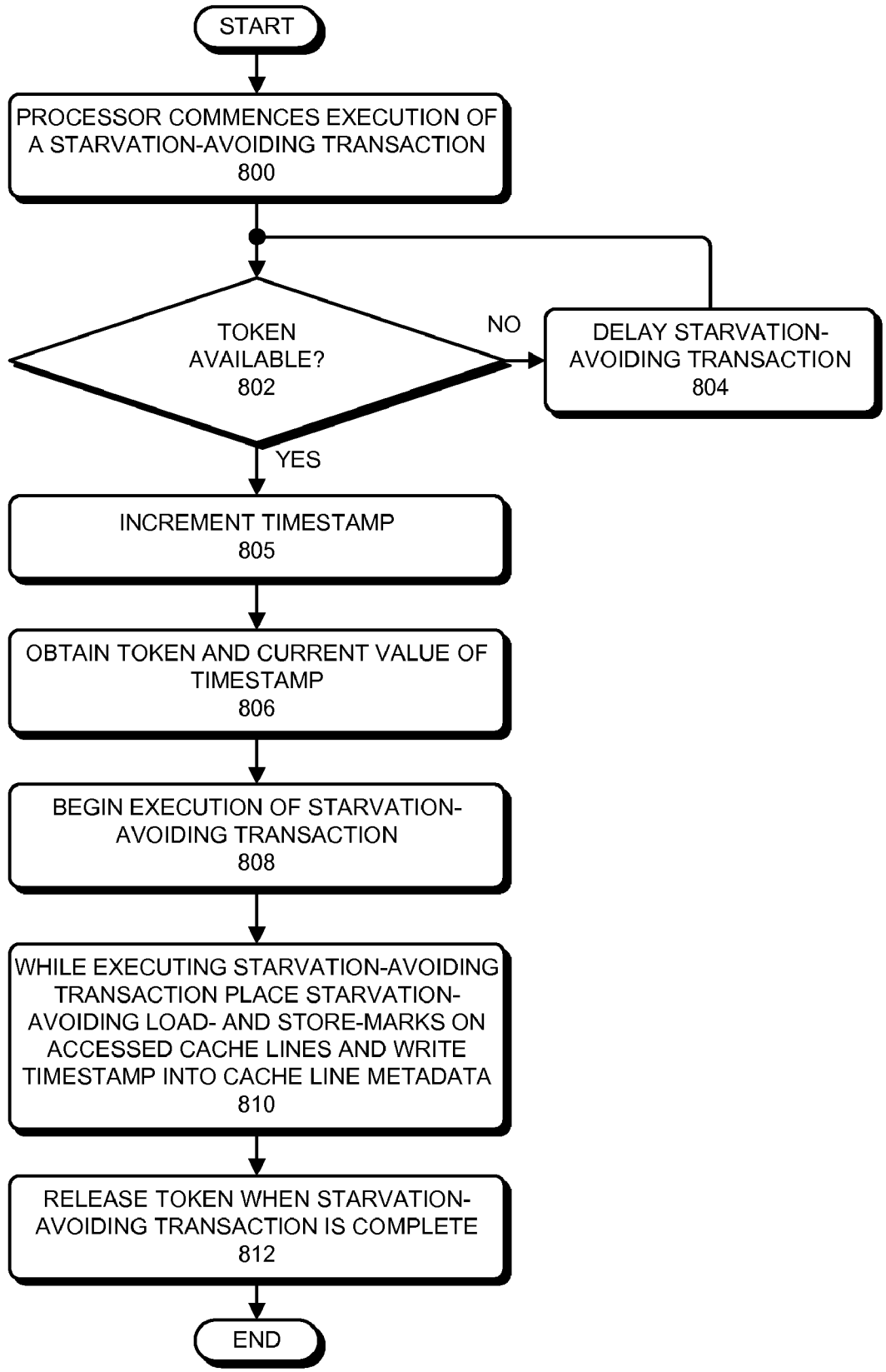
FIG. 8 presents a flowchart illustrating the process of executing a starvation-avoiding transaction in accordance with embodiments of the present invention.

FIG. 8 presents a flowchart illustrating the process of executing a starvation-avoiding transaction in accordance with embodiments of the present invention. The process starts when a processor (or thread) commences execution of a starvation-avoiding transaction (step 800).

The processor first requests the token from token controller 112 (step 802). If the token is held by another processor that is executing a starvation-avoiding transaction, the processor cannot obtain the token. In this case, the processor delays the execution of the starvation-avoiding transaction (step 804).

Otherwise, the system increments the value of the timestamp (step 805) and the processor obtains the token and the current value of the timestamp (step 806). The processor then commences the execution of the starvation-avoiding transaction (step 808). As the processor executes the starvation-avoiding transaction, the processor marks each cache line that is read from or written to with a starvation-avoiding load-mark or a starvation-avoiding store-mark. While placing the starvation-avoiding load-mark or store-mark on the cache line, the processor writes the value of the timestamp to metadata for the cache line (step 810).

Note that writing the timestamp to the metadata for the cache line facilitates executing "unbounded" transactions. This is because starvation-avoiding transactions are not limited by the size of the private buffer (as are non-starvation-avoiding transactions) because each starvation-avoiding load- or store-marked cache line is identifiable by the timestamp in the cache line's metadata. Hence, the processor is not required to maintain a record of each marked cache line in the private buffer during a starvation-avoiding transaction.

When the processor completes the starvation-avoiding transaction, the processor releases the token back to token controller 112 (step 812). In embodiments of the present invention, the processor does not clear the starvation-avoiding load-marks/starvation-avoiding store-marks and the timestamp from the marked cache lines when the starvation-avoiding transaction is completed. Rather, the starvation-avoiding load-marks/starvation-avoiding store-marks and the timestamp can be cleared or overwritten by the next processor (or thread) that loads, stores, load-marks, store-marks, starvation-avoiding load-marks, or starvation-avoiding store-marks the cache line.

Figure 9:
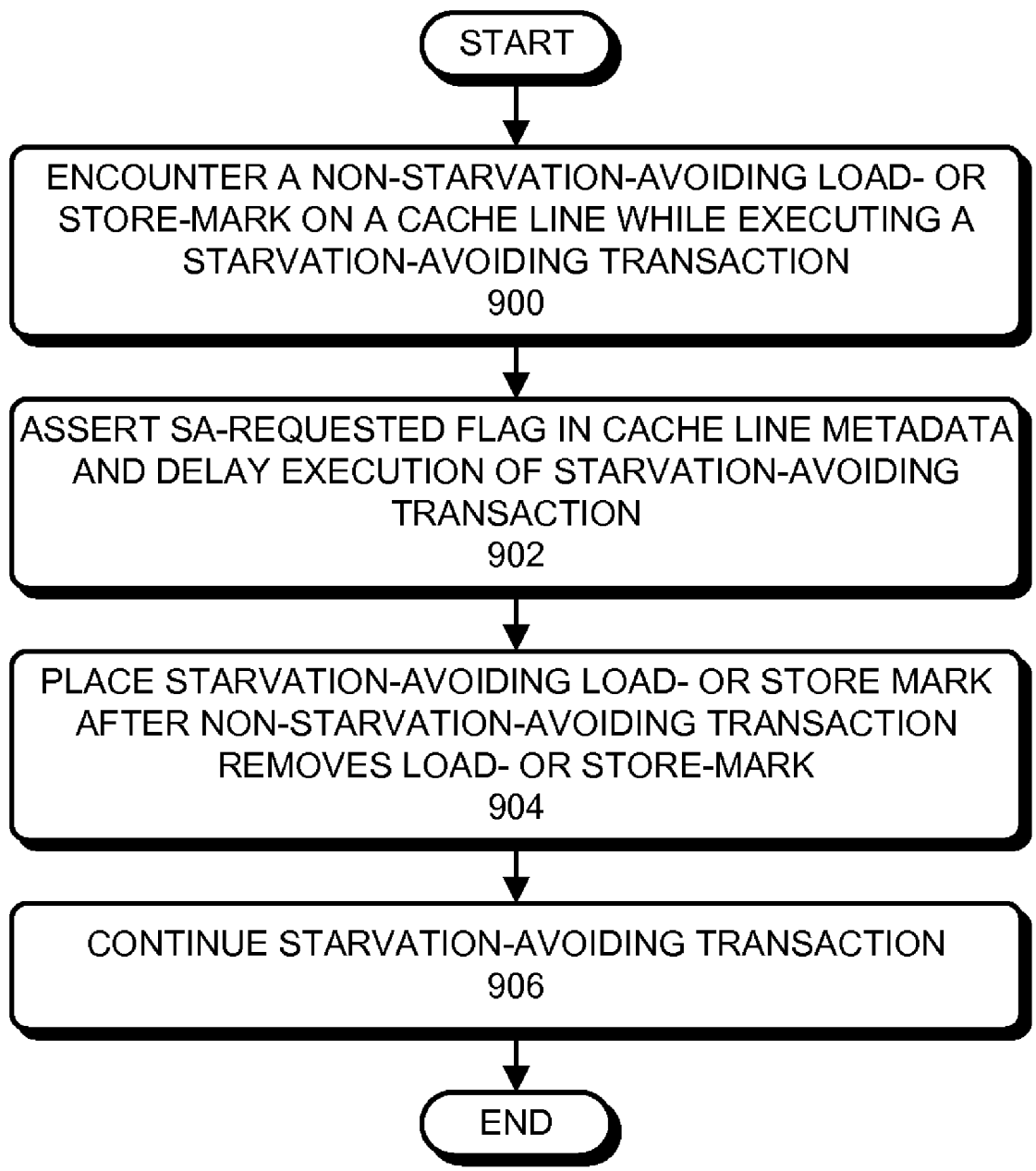
FIG. 9 presents a flowchart illustrating a process for handling a memory conflict between a processor that is executing a starvation-avoiding transaction and a processor that is executing a non-starvation-avoiding transaction in accordance with embodiments of the present invention.

Conflicts Between Starvation-Avoiding Transactions and Non-Starvation-Avoiding Transactions FIG. 9 presents a flowchart illustrating a process for handling a memory conflict between a processor that is executing a starvation-avoiding transaction and a processor that is executing a non-starvation-avoiding transaction in accordance with embodiments of the present invention. The process starts when a processor (or thread) that is executing a starvation-avoiding transaction encounters a memory conflict with a processor (or thread) that is executing a non-starvation-avoiding transaction (step 900). The memory conflict occurs when the processor that is executing the starvation-avoiding transaction encounters a load- or store-mark placed on a cache line by the processor that is executing the non-starvation-avoiding transaction.

In embodiments of the present invention, the marking processor continues to execute the non-starvation-avoiding transaction, while the processor that is executing the starvation-avoiding transaction sets the SA-requested flag in the cache line's metadata and delays the execution of the starvation-avoiding transaction (step 902). When the SA-requested flag is set on the cache line, no other threads can place a load- or store-mark to the cache line. Hence, when the marking processor completes the load or store operation and removes the load- or store-mark, the processor executing the starvation-avoiding transaction places a starvation-avoiding load- or store-mark (step 904) and continues the starvation-avoiding transaction (step 906).

Note that in an alternative embodiment, the non-starvation-executing processor aborts the execution of the transaction when a conflict occurs with a starvation-avoiding transaction, including removing the corresponding load- and store-marks from the cache line. In this embodiment, after the non-starvation-avoiding transaction removes its load- and store-marks, the processor executing the starvation-avoiding transaction continues to execute the starvation-avoiding transaction.

Figure 10:
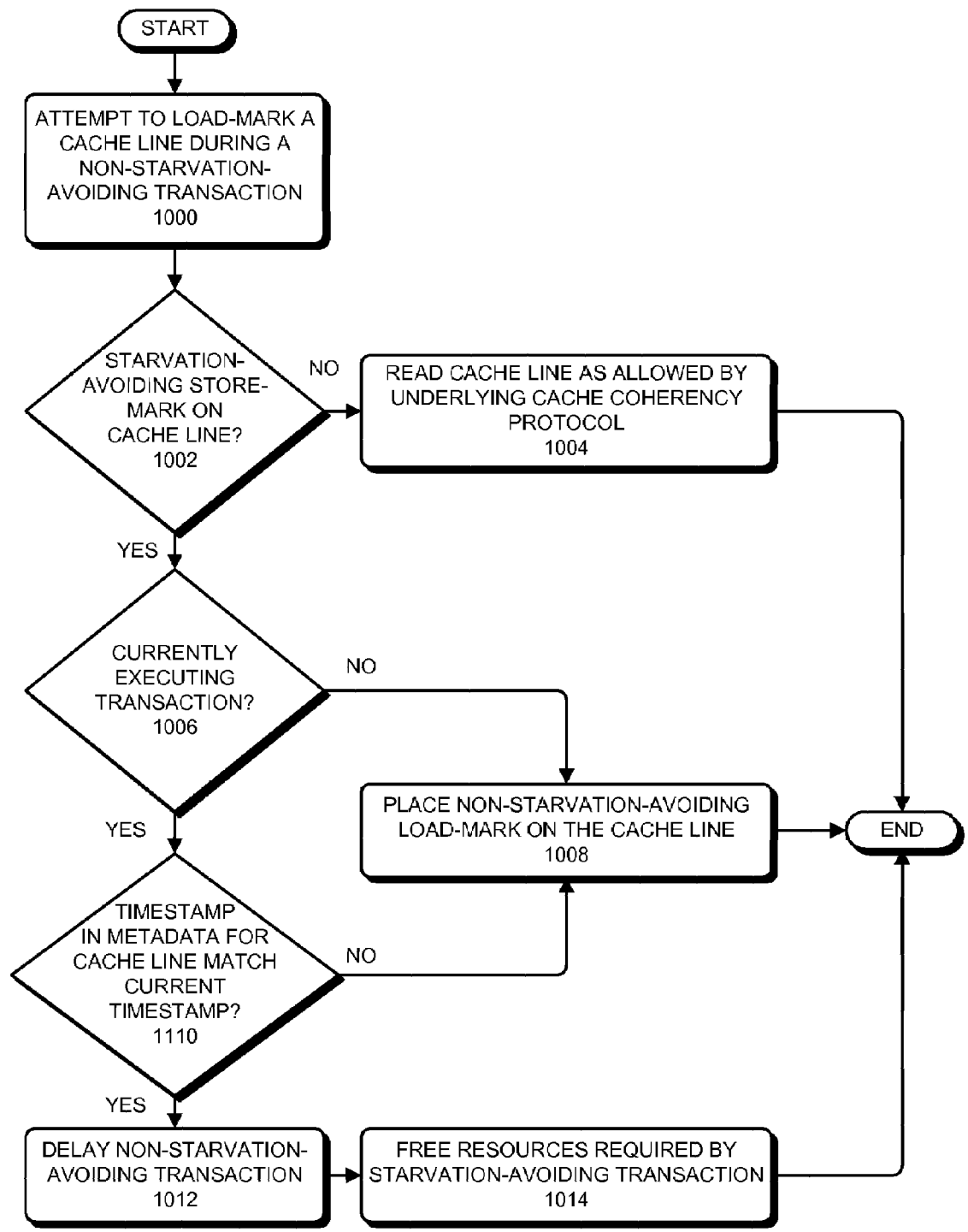
FIG. 10 presents a flowchart illustrating the process for handling a memory conflict between a processor that is executing a non-starvation-avoiding transaction and a processor that is executing a starvation-avoiding transaction in accordance with embodiments of the present invention.

FIG. 10 presents a flowchart illustrating the process for handling a memory conflict between a processor that is executing a non-starvation-avoiding transaction and a processor that is executing a starvation-avoiding transaction in accordance with embodiments of the present invention. The process starts with a processor (or thread) that is executing a non-starvation-avoiding transaction attempts to load-mark a cache line (step 1000). Note that a load-mark is used for purposes of illustration, but store-marks can be handled in a similar fashion.

The processor determines if there is a starvation-avoiding store-mark on the cache line (step 1002). If not, the processor can read the cache line as allowed by the underlying cache coherency protocol (step 1004).

On the other hand, if there is a starvation-avoiding store-mark on the cache line, the processor determines if there is a processor (or thread) that is currently executing a starvation-avoiding transaction (step 1006). If not, the starvation-avoiding store-mark is stale and the processor places the non-starvation-avoiding load-mark on the cache line (step 1008). In embodiments of the present invention, the processor also removes the starvation-avoiding store-mark from the cache line, including removing the timestamp associated with the starvation-avoiding store-mark.

If there is a processor that is executing a starvation-avoiding transaction, the processor determines if the timestamp in the metadata for the marked cache line matches the current timestamp (step 1010). In embodiments of the present invention, each processor keeps a current copy of the timestamp for performing this comparison. In an alternative embodiment, the value for the current timestamp is kept in token controller 112 and each processor reads the timestamp before performing a comparison. If the timestamp does not match the current timestamp, the starvation-avoiding store-mark is stale and the processor places the non-starvation-avoiding load-mark on the cache line (step 1008). In embodiments of the present invention, the processor also removes the starvation-avoiding store-mark from the cache line, including removing the timestamp associated with the starvation-avoiding store-mark.

Otherwise, the store-mark on the cache line was placed by the processor that is currently executing a starvation-avoiding transaction. In this case, the processor delays the non-starvation-avoiding transaction (step 1012) and frees any resources that are required by the starvation-avoiding transaction (step 1014).

Figure 11:
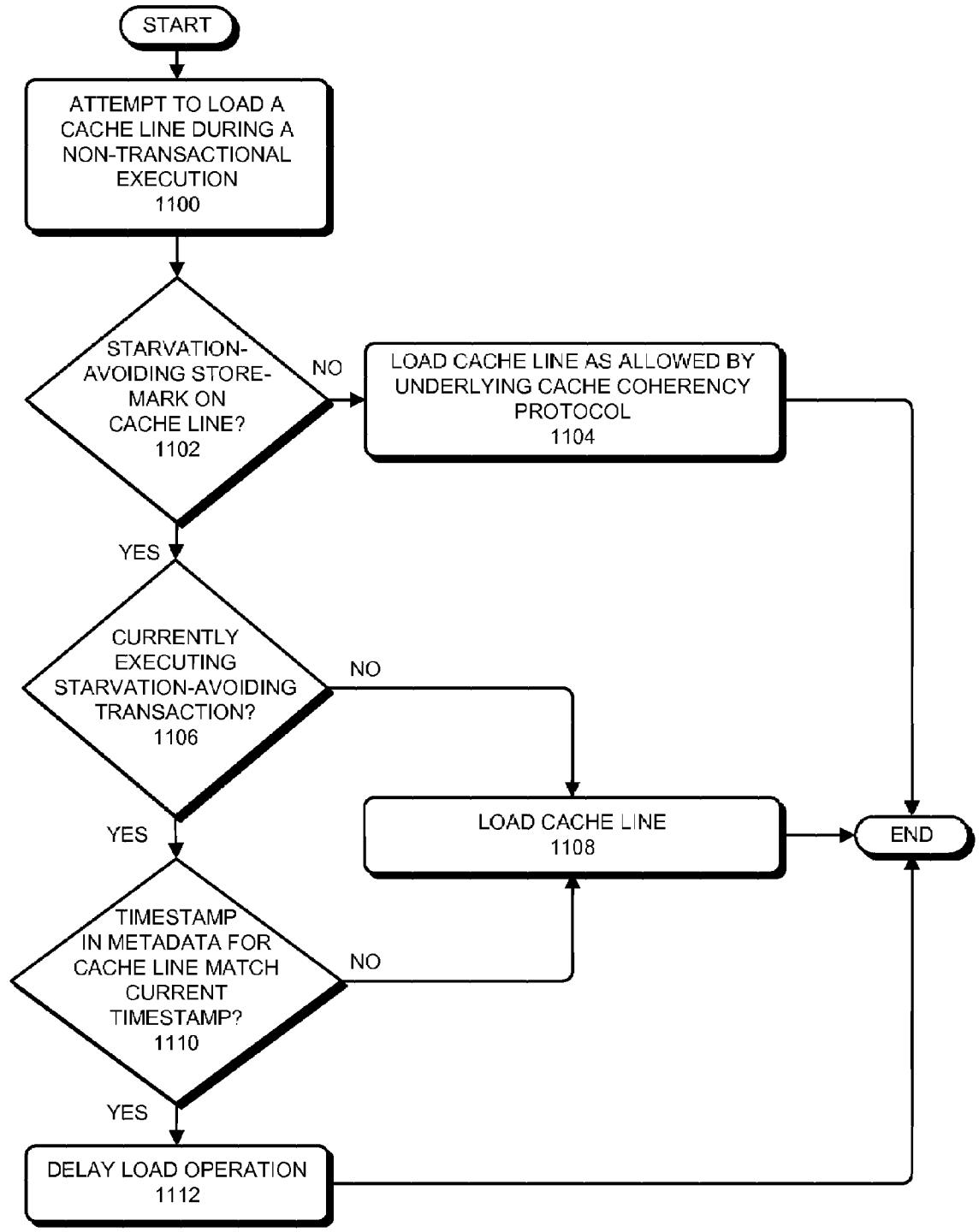
FIG. 11 presents a flowchart illustrating the process for handling a memory conflict between a processor that is executing non-transactionally and a processor that is executing a starvation-avoiding transaction in accordance with embodiments of the present invention.

FIG. 11 presents a flowchart illustrating the process for handling a memory conflict between a processor that is executing non-transactionally and a processor that is executing a starvation-avoiding transaction in accordance with embodiments of the present invention. The process starts when a processor (or thread) attempts to load a cache line during non-transactional execution (step 1100). Note that loading the cache line is used for the purposes of illustration, but storing to the cache line can be handled in a similar fashion.

The processor determines if there is a starvation-avoiding store-mark on the cache line (step 1102). If not, the processor can load the cache line as allowed by the underlying cache coherency protocol (step 1104).

On the other hand, if there is a starvation-avoiding store-mark on the cache line, the processor determines if there is a processor (or thread) that is currently executing a starvation-avoiding transaction (step 1106). If not, the starvation-avoiding store-mark is stale and the processor loads the cache line (step 1108). In embodiments of the present invention, the processor also removes the starvation-avoiding store-mark from the cache line, including removing the timestamp associated with the starvation-avoiding store-mark.

If there is a processor that is executing a starvation-avoiding transaction, the processor determines if the timestamp in the metadata for the marked cache line matches the current timestamp (step 1110). In embodiments of the present invention, each processor keeps a current copy of the timestamp for performing this determination. In an alternative embodiment, the value for the current timestamp is kept in token controller 112 and each processor reads the timestamp before performing the determination. If the timestamp does not match the current timestamp, the starvation-avoiding store-mark is stale and the processor loads the cache line (step 1108). In embodiments of the present invention, the processor also removes the starvation-avoiding store-mark from the cache line, including removing the timestamp associated with the starvation-avoiding store-mark.

Otherwise, the store-mark on the cache line was placed by the processor that is currently executing a starvation-avoiding transaction. In this case, the processor delays the load operation (step 1112).

DMA Reads for Paging and DMA Writes for Paging

In embodiments of the present invention, CMP 100 uses DMA controller 120 to perform DMA reads and/or DMA writes for paging between memory (i.e., the L1 caches, the L2 cache, and memory 119) and disk 122. Because cache lines within the pages of memory can include non-starvation-avoiding load-marks and non-starvation-avoiding store-marks (collectively "standard marks"), as well as starvation-avoiding load-marks and starvation-avoiding store-marks (collectively "SA marks") on which one or more threads may depend, the system performs certain operations to maintain the standard marks and the SA marks during DMA reads for paging and/or DMA writes for paging.

The terms "DMA reads for paging" and "DMA writes for paging" refer to the operations involved in using a DMA controller to move "pages" from disk 122 to the memory and back. For example, a DMA write for paging can cause DMA controller 120 write a page into a frame in the memory (such as a frame in L2 cache 105) from disk 122.

We also refer to these DMA operations as "swapping-in" or "swapping-out" the pages. When a page is swapped in, the page is placed into a frame in the memory and when a page is swapped out of the memory, the page is removed from the corresponding frame in the memory. When a page has been swapped out of the memory, the frame can be overwritten by another page. However, until the frame is overwritten, the metadata for the cache lines within the page persists.

We describe embodiments of the present invention that affect both DMA reads for paging and DMA writes for paging. Other types of DMA, such as for networking and for data transfer to and from peripherals use mechanisms that are well-known in the art. Hence, although we describe only DMA reads for paging and DMA writes for paging, we refer to the DMA read for paging as a "DMA read" and the DMA write for paging as a "DMA write" in the following sections.

We now describe how embodiments of the present invention handle various types of load-marks and store-marks.

Non-Starvation-Avoiding Load- and Store-Marks

Standard marks are removed by the thread (or processor) that placed them. Hence, in some embodiments of the present invention, the task of swapping out a page is delayed until all standard marks have been cleared. In other words, the page cannot be swapped out until the threads that placed the standard marks have completed their transactions and cleared their marks.

Starvation-Avoiding Load- and Store-Marks

SA marks are not necessarily removed by the thread (or processor) that placed them. That is, the thread that placed the SA marks is not obligated to remove the SA marks when the underlying starvation-avoiding transaction completes. Consequently, pages that include SA marks can be swapped out despite the fact that the underlying starvation-avoiding transaction is still executing.

Although SA-marked pages can be swapped out, when a page is swapped in, any cache line within the page that may have had an SA mark when the cache line was swapped out must have its SA mark set in its metadata (and the associated timestamp must also be set to the current value).

Tracking Starvation-Avoiding Load-Marks and Store-Marks

Detecting SA Marks on Cache Lines in a Page

In order to place SA marks in the metadata for cache lines when a page is swapped in, some embodiments of the present invention maintain a record of SA marks that existed for the cache lines when the page was swapped out. These embodiments must therefore detect which cache lines included SA marks when their associated pages were swapped out.

To accomplish this, some embodiments of the present invention read the metadata for each cache line in the page to determine if the cache line includes an SA mark when the page is swapped out. Alternative embodiments only read the metadata for each cache line in the page when the page is swapped out if the page is dirty (if a cache line in the page has been modified).

Some embodiments of the present invention defer reading the metadata for each cache line in a page that is swapped out until the frame is subsequently written to (while swapping-in a potentially different page). These embodiments require that the frame is guaranteed to be written to no later than when the page is swapped back in, which can be guaranteed by always swapping a page back in to the same frame (if that frame has not been used since the page was swapped out). After reading the metadata for the cache lines, these embodiments record information about SA marks which are present on cache lines in the page.

Cache-Line-Level SA Mark Record

Some embodiments of the present invention maintain a record of the SA marks that were present on a swapped-out page at the cache-line-level. In these embodiments, the system records the type of SA mark for each cache line in the swapped-out page along with the address of the cache line.

For example, the system can create a linked list for each swapped-out page, wherein each element in the list includes the address of a cache line and the type of SA mark(s) that were present on the cache line. The system may also create two linked lists for each swapped-out page; a linked list for starvation-avoiding load-marks and a linked list for starvation-avoiding store-marks. In this case, the elements of each list include the addresses of the cache lines that included the corresponding type of SA mark. Alternatively, instead of using a linked list, the system can use another type of data structure to keep track of SA marks, such as an array, a hash table, or another suitable data structure.

Upon swapping the page into the memory, the system reads the associated data structure to determine which cache lines included SA marks. For each cache line that included an SA mark, the system places the appropriate SA mark in the metadata for the cache line in the swapped-in page (including the current timestamp). The system then deletes the record for that cache line from the data structure.

Page-Level SA Mark Record

Other embodiments of the present invention maintain a record of the SA marks that were present in the swapped-out page at the page-level. In these embodiments, if a cache line in the swapped-out page included an SA mark, the system records that an SA mark was present in the page.

For example, the system can maintain a starvation-avoiding load-mark variable and a starvation-avoiding store-mark variable for each swapped-out page. When the system determines that the swapped out page included a starvation-avoiding load-mark or a starvation-avoiding store-mark, the system sets the corresponding variable for the page.

Some embodiments of the present invention that maintain records at the page-level maintain this information in a translation table, which is used by the system to translate virtual addresses to virtual addresses for pages. For example, the system can maintain 2 bits per translation table entry (TTE) which indicate if the corresponding swapped out page has an SA mark. One bit is set if a cache line in the page had a starvation-avoiding load-mark when the page was swapped out, while the other bit is set if a cache line in the page had a starvation-avoiding store-mark when the page was swapped out. Whenever a page is swapped in, if the bit associated with a starvation-avoiding store-mark or a starvation-avoiding load-mark is set, the corresponding starvation-avoiding load-mark or starvation-avoiding store-mark is set for all cache lines in the page.

In order to avoid the need to track which page on the free-list is being overwritten and updating the page's TTE with the correct SA marks, some embodiments keep track of whenever a clean page with a starvation-avoiding load-mark with the current timestamp is swapped out. In these embodiments, whenever a page is swapped in during the same SA episode all cache lines on that page are given a starvation-avoiding load-mark with the same timestamp.

Some embodiments of the present invention add the timestamp of the starvation-avoiding load-marks or starvation-avoiding store-marks of swapped-out pages to the page's TTE. These embodiments set the SA marks while swapping in the page if the timestamp matches the timestamp of the current starvation-avoiding transaction.

Upon swapping the page into the memory, the system uses the record of the SA marks for the page to place the corresponding SA mark on all the cache lines in the page. For example, if the starvation-avoiding store-mark variable is set for a page, when the page is swapped in, the system places a starvation-avoiding store-mark on all cache lines in the page. After the SA marks have been placed on the cache lines in a swapped-in page, the system clears the page-level starvation-avoiding load-mark and the starvation-avoiding store-mark variables.

System-Level SA Mark Record

Other embodiments of the present invention maintain a record of the SA marks that were present in the swapped-out page at the system-level. In these embodiments, if a cache line in a swapped out page included an SA mark, the system records that the SA mark was present in a swapped out page. For example, the system can maintain a system-level starvation-avoiding load-mark variable and a system-level starvation-avoiding store-mark variable. When the system determines that a swapped out page included a starvation-avoiding load-mark or a starvation-avoiding store-mark, the system sets the corresponding variable.

Upon swapping in any page, if the system-level starvation-avoiding load-mark or the system-level starvation-avoiding store-mark variable is set, the system places the corresponding SA mark on all cache lines in the page. The system then clears the system-level starvation-avoiding load-mark variable or system-level starvation-avoiding store-mark variable when the starvation-avoiding transaction is completed.

Note that although some cache lines which were not SA marked when a page was swapped out may be SA marked when the page is swapped in. This will not affect correctness, it will only affect performance. In other words, the cache lines that are incorrectly SA marked have unnecessary restrictions (as described above) on accesses by other threads, but when the timestamp is updated at the end of the starvation-avoiding transaction these restrictions will be lifted and the other threads will be allowed access to the cache line.

Figure 12:
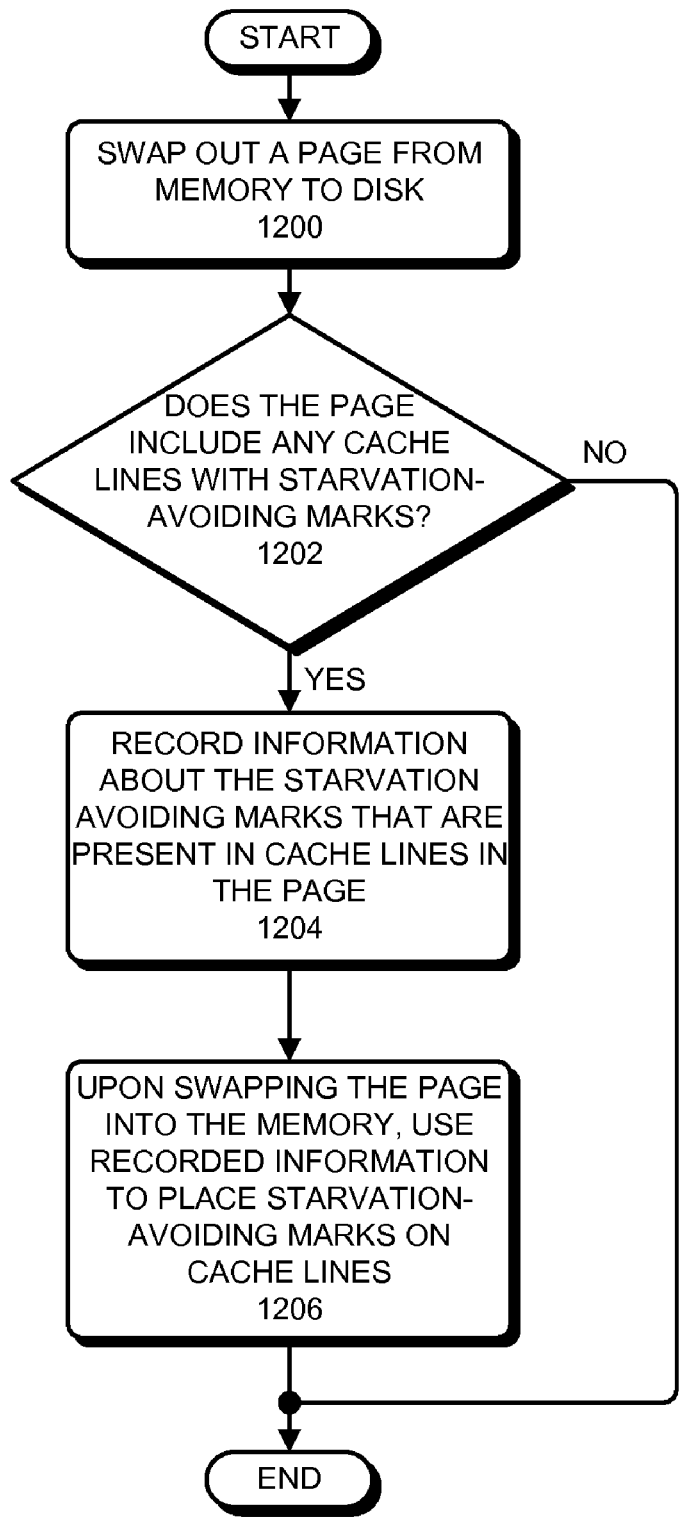
FIG. 12 presents a flowchart illustrating the process of placing starvation-avoiding load-marks and starvation-avoiding store-marks on cache lines in a swapped-in page in accordance with embodiments of the present invention.

Placing Starvation-Avoiding Load-Marks and Starvation-Avoiding Store-Marks on Cache Lines in Swapped-In Pages FIG. 12 presents a flowchart illustrating the process of placing starvation-avoiding load-marks and starvation-avoiding store-marks on cache lines in a swapped-in page in accordance with embodiments of the present invention. The process starts when the system swaps a page out of the memory and to disk 122 (step 1200).

The system first determines if the page includes any cache lines with a starvation-avoiding load-mark or a starvation-avoiding store-mark (step 1202). In some embodiments, when making this determination, the system reads the metadata for the cache lines on the page as the page is swapped out. In alternative embodiments, the system reads the metadata for the cache lines after the page is swapped out, but before the metadata in the memory is overwritten (i.e., before another page is swapped into the frame). If the swapped-out page has no cache lines with a starvation-avoiding load-mark or starvation-avoiding store-mark, the process is complete.

Otherwise, if the swapped-out page includes cache lines with a starvation-avoiding load-mark or a starvation-avoiding store-mark, the system records information about the starvation-avoiding load-marks or starvation-avoiding store-marks (step 1204).

Some embodiments of the present invention record this information at the cache-line level. In these embodiments, the system maintains a record for each SA marked cache line in the swapped-out page which indicates the type(s) of mark(s) that were present on the cache line. Alternative embodiments record this information at a higher level, such as the page-level or at the system-level (or at some level between the page-level and the system-level such as embodiments that record information for a group of pages). In these embodiments, the system records whether a swapped-out page included a cache line that had a starvation-avoiding load-mark or a starvation-avoiding store-mark.

Upon swapping the page into the memory from disk 122, the system uses the recorded information to place starvation-avoiding load-marks and starvation-avoiding store-marks on the corresponding cache lines (step 1206). In the embodiments where the system records the presence of SA marks at the cache-line level, the system places the appropriate SA marks on the individual cache lines in the swapped-in page. In contrast, in the embodiments where the system recorded the presence of SA marks at the page-level or at the system-level, the system places the appropriate SA marks on all the cache lines in the swapped-in page.

Some embodiments of the present invention may modify the cache coherence protocol in order to facilitate DMA read and DMA write operations. In particular, certain embodiments may implement one or more of the three following modifications to the cache coherence protocol. First, certain DMA read and/or DMA write operations may return the status of SA marks on the cache lines being read or written, in order to determine which lines in a page contain SA load-marks and SA store-marks. Second, certain DMA read operations may be able to read the data in cache lines containing SA store-marks, even though such cache lines are normally only readable by the thread that placed the SA store-marks. Third, certain DMA write operations may be able to overwrite cache lines that contain SA load-marks or SA store-marks, even though such cache lines are normally only writable by the thread that placed the SA load-marks or SA store-marks.

Virtual Memory Techniques

Embodiments of the present invention use standard virtual memory techniques to guarantee that no accesses are made to pages that are swapped out or that could conflict with DMA operations that swap pages in or out. For example, some embodiments use Translation-Lookaside Buffer (TLB) shoot-downs or other virtual memory techniques to assure that no conflicting accesses are made to swapped out pages.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for marking cache lines, comprising:
executing a starvation-avoiding transaction for a thread;
placing starvation-avoiding load-marks on cache lines which are loaded from during the starvation-avoiding transaction;
placing starvation-avoiding store-marks on cache lines which are stored to during the starvation-avoiding transaction;
swapping a page out of a memory and to a disk during the starvation-avoiding transaction, wherein swapping the page involves determining if one or more cache lines in the page have a starvation-avoiding load-mark or a starvation-avoiding store-mark; and
if so, upon swapping the page into the memory from the disk, placing a starvation-avoiding load-mark on each cache line that had a starvation-avoiding load-mark and placing a starvation-avoiding store-mark on each cache line that had a starvation-avoiding store-mark.

2. The method of claim 1, wherein the process of determining if one or more cache lines in the page have a starvation-avoiding load-mark or starvation-avoiding store-mark takes place:
as the page is swapped out of the memory; or
after the page has been swapped out of the memory, but before any starvation-avoiding load-mark or starvation-avoiding store-marks for the cache lines in the page have been overwritten in the memory.

3. The method of claim 2, wherein the method further comprises:
recording a cache line address and a starvation-avoiding load-mark indicator for each cache line in the page that is determined to have a starvation-avoiding load-mark, and recording a cache line address and a starvation-avoiding store-mark indicator for each cache line on the page that is determined to have a starvation-avoiding store-mark; and
wherein swapping the page into the memory from the disk involves placing a starvation-avoiding load-mark or a starvation-avoiding store-mark on each cache line that was recorded as having a starvation-avoiding load-mark or a starvation-avoiding store-mark.

4. The method of claim 2, wherein the method further comprises:
setting a starvation-avoiding load-mark indicator for the page if the page includes any cache line that has a starvation-avoiding load-mark;
setting a starvation-avoiding store-mark indicator for the page if the page includes any cache line that has a starvation-avoiding store-mark; and
wherein swapping the page into the memory from the disk involves placing a starvation-avoiding load-mark on all cache lines in the page if the starvation-avoiding load-mark indicator for the page is set, and placing a starvation-avoiding store-mark on all cache lines in the page if the starvation-avoiding store-mark indicator for the page is set.

5. The method of claim 4, wherein setting a starvation-avoiding load-mark indicator or a starvation-avoiding store-mark indicator involves setting a load-mark indicator bit or a store-mark indicator bit in a translation table entry for the page.

6. The method of claim 2, wherein the method further comprises:
setting a system-level starvation-avoiding load-mark indicator if the page includes a cache line that had a starvation-avoiding load-mark and setting a system-level starvation-avoiding store-mark indicator if the page includes a cache line that had a starvation-avoiding store-mark; and
wherein swapping the page or any other page into the memory from the disk involves placing a starvation-avoiding load-mark on all cache lines in the page if the system-level starvation-avoiding load-mark indicator is set and placing a starvation-avoiding store-mark on all cache lines in the page if the system-level starvation-avoiding store-mark indicator is set.

7. The method of claim 2, wherein the method further comprises allowing certain direct memory access (DMA) read operations to read the data in cache lines containing starvation-avoiding store marks.

8. The method of claim 2, wherein the method further comprises allowing certain DMA write operations to overwrite the data in cache lines containing starvation-avoiding load-marks and starvation-avoiding store-marks.

9. The method of claim 1, wherein the method further comprises:
- executing at least one non-starvation-avoiding transaction for another thread while executing the starvation-avoiding transaction;
- wherein executing the non-starvation-avoiding transaction involves
  - placing non-starvation-avoiding load-marks on cache lines which are loaded during the non-starvation-avoiding transaction and placing non-starvation-avoiding store-marks on cache lines which are stored to during the non-starvation-avoiding transaction; and
  - storing the addresses of non-starvation-avoiding load-marked or non-starvation-avoiding store-marked cache lines in a private buffer corresponding to the other thread.

10. The method of claim 9, further comprising:
- determining if at least one cache line in the page has a non-starvation-avoiding load-mark or a non-starvation-avoiding store-mark; and
- if so, delaying swapping out the page until the non-starvation-avoiding load-mark or non-starvation-avoiding store-mark has been cleared from the cache line.

11. The method of claim 1, wherein placing a starvation-avoiding load-mark or a starvation-avoiding store-mark in metadata for each cache line involves writing a current value for a timestamp into the metadata for the cache line.

12. The method of claim 1, wherein if the frame in the memory has not been overwritten since the page was swapped out, the method further comprises swapping the page back into the same frame in the memory from the disk, wherein the metadata for any starvation-avoiding load-marked or starvation-avoiding store-marked cache line still contains the starvation-avoiding load-mark and starvation-avoiding store-mark.

13. An apparatus for marking cache lines, comprising:
- a processor;
- a memory coupled to the processor, wherein the memory stores data for the processor in cache lines;
- an execution mechanism on the processor;
- wherein the execution mechanism is configured to execute a starvation-avoiding transaction for a thread;
- wherein the execution mechanism is configured to place starvation-avoiding load-mark on cache lines which are loaded from during the starvation-avoiding transaction and place starvation-avoiding store-mark on cache lines which are stored to during the starvation-avoiding transaction;
- wherein upon swapping a page out the memory and to a disk during the starvation-avoiding transaction, the execution mechanism is configured to determine if one or more cache lines in the page have a starvation-avoiding load-mark or a starvation-avoiding store-mark; and
- if so, upon swapping the page into the memory from the disk, the execution mechanism is configured to place a starvation-avoiding load-mark on each cache line that had a starvation-avoiding load-mark and place a starvation-avoiding store-mark on each cache line that had a starvation-avoiding store-mark.

14. The apparatus of claim 13, wherein the execution mechanism is configured to determine if one or more cache lines in the page have a starvation-avoiding load-mark or starvation-avoiding store-mark:
- as the page is swapped out of the memory; or
- after the page has been swapped out of the memory, but before any starvation-avoiding load-mark or starvation-avoiding store-marks for the cache lines in the page have been overwritten in the memory.

15. The apparatus of claim 14, wherein the execution mechanism is configured to record a cache line address and a starvation-avoiding load-mark indicator for each cache line in the page that is determined to have a starvation-avoiding load-mark, and record a cache line address and a starvation-avoiding store-mark indicator for each cache line on the page that is determined to have a starvation-avoiding store-mark; and
- wherein when swapping the page into the memory from the disk, the execution mechanism is configured to place a starvation-avoiding load-mark or a starvation-avoiding store-mark on each cache line that was recorded as having a starvation-avoiding load-mark or a starvation-avoiding store-mark.

16. The apparatus of claim 14, wherein the execution mechanism is configured to set a starvation-avoiding load-mark indicator for the page if the page includes any cache line that has a starvation-avoiding load-mark, and set a starvation-avoiding store-mark indicator for the page if the page includes any cache line that has a starvation-avoiding store-mark; and
- wherein when swapping the page into the memory from the disk, the execution mechanism is configured to place a starvation-avoiding load-mark on all cache lines in the page if the starvation-avoiding load-mark indicator for the page is set and place a starvation-avoiding store-mark on all cache lines in the page if the starvation-avoiding store-mark indicator for the page is set.

17. The apparatus of claim 16, wherein when setting a starvation-avoiding load-mark indicator or a starvation-avoiding store-mark indicator, the execution mechanism is configured to set a load-mark indicator bit or a store-mark indicator bit in a translation table entry for the page.

18. The apparatus of claim 14, wherein the execution mechanism is configured to set a system-level starvation-avoiding load-mark indicator if the page includes a cache line that had a starvation-avoiding load-mark, and set a system-level starvation-avoiding store-mark indicator if the page includes a cache line that had a starvation-avoiding store-mark; and
- wherein when swapping the page or any other page into the memory from the disk, the execution mechanism is configured to place a starvation-avoiding load-mark on all cache lines in the page if the system-level starvation-avoiding load-mark indicator is set, and place a starvation-avoiding store-mark on all cache lines in the page if the system-level starvation-avoiding store-mark indicator is set.

19. The apparatus of claim 14, wherein the execution mechanism is configured to allow certain direct memory access (DMA) read operations to read the data in cache lines containing starvation-avoiding store marks.

20. The apparatus of claim 14, wherein the execution mechanism is configured to allow certain DMA write operations to overwrite the data in cache lines containing starvation-avoiding load-marks and starvation-avoiding store-marks.

21. The apparatus of claim 13, wherein the execution mechanism is configured to execute at least one non-starvation-avoiding transaction for another thread while executing the starvation-avoiding transaction;

wherein when executing the non-starvation-avoiding transaction, the execution mechanism is configured to place non-starvation-avoiding load-mark on cache lines which are loaded during the non-starvation-avoiding transaction;

place non-starvation-avoiding store-mark on cache lines which are stored to during the non-starvation-avoiding transaction; and store the addresses of non-starvation-avoiding load-marked or non-starvation-avoiding store-marked cache lines in a private buffer corresponding to the other thread.

22. The apparatus of claim 21, wherein the execution mechanism is configured to determine if at least one cache line in the page has a non-starvation-avoiding load-mark or a non-starvation-avoiding store-mark; and if at least one cache line in the page has a non-starvation-avoiding load-mark or a non-starvation-avoiding store-mark, the execution mechanism is configured to delay swapping out the page until the non-starvation-avoiding load-mark or non-starvation-avoiding store-mark has been cleared from the cache line.

23. The apparatus of claim 13, wherein when placing a starvation-avoiding load-mark or a starvation-avoiding store-mark in metadata for each cache line, the execution mechanism is configured to write a current value for a timestamp into the metadata for the cache line.

24. The apparatus of claim 13, wherein if the frame in the cache has not been overwritten since the page was swapped out of the memory, the execution mechanism is configured to swap the page back into the same frame in the memory from the disk, wherein the metadata for any starvation-avoiding load-marked or starvation-avoiding store-marked cache line still contains the starvation-avoiding load-mark and starvation-avoiding store-mark.

\* \* \* \* \*